(12) United States Patent  
Karaoguz et al.

(10) Patent No.: US 8,159,985 B2
(45) Date of Patent: *Apr. 17, 2012

(54) REGISTERING ACCESS DEVICE MULTIMEDIA CONTENT VIA A BROADBAND ACCESS GATEWAY

(75) Inventors: Jeyhan Karaoguz, Irvine, CA (US); Marc Abrams, Aliso Viejo, CA (US); Nambirajan Seshadri, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 322 days.

This patent is subject to a terminal disclaimer.

(21) Appl. No.: 12/427,533

(22) Filed: Apr. 21, 2009

(65) Prior Publication Data

US 2009/0215388 A1 Aug. 27, 2009

Related U.S. Application Data

(63) Continuation of application No. 11/095,842, filed on Mar. 30, 2005, now Pat. No. 7,522,549.

(60) Provisional application No. 60/563,894, filed on Apr. 16, 2004.

(51) Int. Cl.
*H04H 20/71* (2008.01)
(52) U.S. Cl. ........ 370/312; 370/349; 370/401; 709/223; 709/249; 709/250; 725/44; 725/50; 725/59; 455/432.3
(58) Field of Classification Search ............... 370/310, 370/310.2, 349, 351–356, 389, 398, 401–403, 370/312; 709/238, 244, 249, 250, 223, 229; 386/46, 125; 725/38–59, 78–80, 114–117, 725/135–142; 455/432.3
See application file for complete search history.

(56) References Cited

U.S. PATENT DOCUMENTS

| | | | | |
|---|---|---|---|---|
| 6,662,205 B1* | 12/2003 | Bereiter | ........................ | 709/223 |
| 7,522,549 B2* | 4/2009 | Karaoguz et al. | ............. | 370/349 |
| 2001/0010685 A1* | 8/2001 | Aho | .............................. | 370/352 |
| 2001/0030950 A1* | 10/2001 | Chen et al. | ..................... | 370/401 |
| 2002/0035699 A1* | 3/2002 | Crosbie | ......................... | 709/229 |
| 2002/0166119 A1* | 11/2002 | Cristofalo | ....................... | 725/46 |
| 2002/0198977 A1* | 12/2002 | Cho | ............................... | 709/223 |
| 2003/0009587 A1* | 1/2003 | Harrow et al. | ................ | 709/238 |
| 2003/0068154 A1* | 4/2003 | Zylka | ............................. | 386/125 |
| 2003/0208554 A1* | 11/2003 | Holder | .......................... | 709/229 |
| 2005/0254485 A1* | 11/2005 | Parker et al. | .................. | 370/356 |
| 2006/0133391 A1* | 6/2006 | Kang et al. | ..................... | 370/401 |

* cited by examiner

*Primary Examiner* — Jeffrey M Rutkowski
(74) *Attorney, Agent, or Firm* — Brinks Hofer Gilson & Lione

(57) ABSTRACT

A system and method of registering or exchanging information about the availability of multimedia information and services is disclosed. Access devices in a wireless local area network (WLAN) and/or personal area network (PAN) may register, with a wireless broadband access gateway, selected information about multimedia information and services that they have and may share. Information about the available multimedia information and services may be shared by the wireless broadband access gateway with other access devices within the coverage area of the WLAN or PAN. Access devices may then access the multimedia information and services of other access devices via the wireless broadband access gateway, based upon information identifying and authenticating the recipient. A broadband connection permits the gateway to pass multimedia information and service activity to and from the access devices within the coverage area of the WLAN or PAN.

40 Claims, 12 Drawing Sheets

REGISTERING ACCESS DEVICE MULTIMEDIA CONTENT VIA A BROADBAND ACCESS GATEWAY

RELATED APPLICATIONS

The present application is a continuation of U.S. patent application Ser. No. 11/095,842 entitled "Registering Access Device Multimedia Content Via A Broadband Access Gateway", filed Mar. 30, 2005, now U.S. Pat. No. 7,522,549, which makes reference to, claims priority to, and claims benefit of U.S. Provisional Patent Application Ser. No. 60/563,894, entitled "Method And System For Handling And Backhauling Traffic From A Wired And/Or Wireless WAN, LAN, And/Or PAN Using A Broadband Access Gateway", filed Apr. 16, 2004, the complete subject matter of each of which is hereby incorporated herein by reference, in its entirety. With respect to the present application, Applicants hereby rescind any disclaimer of claim scope made in the parent application or any predecessor or related application. The Examiner is advised that any previous disclaimer of claim scope, if any, and the alleged prior art that it was made to allegedly avoid, may need to be revisited. Nor should a disclaimer of claim scope, if any, in the present application be read back into any predecessor or related application.

The present application makes reference to U.S. patent application Ser. No. 11/021,294, entitled "Method And System For Extended Network Access Services Advertising Via A Broadband Access Gateway", filed Dec. 23, 2004, the complete subject matter of which is hereby incorporated herein by reference, in its entirety.

The present application also makes reference to U.S. patent application Ser. No. 11/039,020, entitled "Method And System For Providing Registration, Authentication, And Access Via A Broadband Access Gateway", filed Jan. 18, 2005, the complete subject matter of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

One major common problem faced by cellular and landline service providers is market competition. In today's climate of competitive markets, cellular service providers have found that one way for them to grow market share and defend their businesses is to be proactive and form alliances, and to partner with landline service providers. In addition, cellular service providers seek to differentiate their service offerings, and to capture the largest portion of market revenue by meeting an ever increasing demand for access to a wide range of media forms such as MP3 encoded audio, still and video imaging, data, instant messaging, and email. In a similar manner, the landline service providers have found that to grow market share and ward off competition, they too must be proactive and form alliances, and to partner with cellular service providers. Support for broad economical access to these converging forms of communication is needed to enable unfettered market growth, and to support the development and use of new handheld devices needed to provide increasing levels of mobile multimedia communication functionality.

Although the formation of alliances and partnerships between cellular service providers and landline service providers may help to ward off competition, such alliances and partnerships are faced with other problems. For example, the erection of cellular infrastructure such as cellular towers may be an expensive venture since this may require acquisition of real estate, whether in the form of outright purchases or through leasing. Cellular infrastructure also requires the establishment of one or more expensive backbone links to handle core network traffic. Another cellular-related problem is that the cellular signals do not penetrate and propagate in buildings such as homes and offices very well. This is especially true with the frequencies that are typically utilized in the United States, which may vary between 800 MHz and 1900 MHz or 1.9 GHz.

The use of digital media is growing at an extremely rapid pace. Most consumers today have a variety of devices that gather, store, process, generate, communicate, play back, and/or display information electronically, in a digital form. Examples of such devices include digital still and video cameras, personal digital assistants (PDAs), laptop and desktop personal computer (PC) systems, video cassette recorders (VCRs), personal video recorders (PVRs), document and photo scanners, digital and high definition television sets, stereo audio equipment, and cellular phones, to name only a few. Many times, this multimedia information is of interest to others, and the consumer has a desire to share the information with friends, family, and business associates. In some situations, the exchange may be accomplished by attaching copies of the information to electronic mail sent to those with whom the information is to be shared. In other situations, physical media containing a copy of the information may be sent by regular mail or express carriers, or delivered personally. The act of electronically sharing copies of multimedia information can be confusing even when the individual with whom the information is to be shared is physically with the individual doing the sharing.

Although technically savvy individuals may make such information available via, for example, an Internet web page, most consumers have no means of sharing electronic information in a convenient manner, while still maintaining control over who has access. The individual having a use for the information may not be aware that it is available. Most acts of sharing electronic forms of information subject to change, requires repeated, active involvement in providing updated copies. For example, information such as a personal calendar, address book, or telephone directory, may be of use to business associates or family members. Making certain that others that may make use of the information have the most recent copies currently requires active effort to effect the updates. Access to information on devices such as those listed above typically involves cabling the device that is the source of the information to the device that is to receive the information, and the use of software for transferring the information. The physical connection of cables between pieces of equipment, and the configuration and use of software for such a transfer is an intimidating activity for many users. This limits the exchange of such digital information to those having familiarity with the processes involved in sharing.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and method for supporting sharing of at least one of multimedia information and media-related services among a plurality of access devices, substantially as shown in and/or described in connection with at least one of the figures, as set forth more completely in the claims.

These and other advantages, aspects, and novel features of the present invention, as well as details of illustrated embodiments, thereof, will be more fully understood from the following description and drawings.

DETAILED DESCRIPTION OF THE INVENTION

Aspects of the present invention relate to the seamless merging of wide area networks, from any kind of wired and/or wireless wide area networks, to pockets of wired and/or wireless local area networks and personal area networks, which may be located in homes or other environment such as an office or business. More specifically, aspects of the present invention pertain to the registration or sharing, via a broadband access gateway, of information describing multimedia information and media-related services that may be available on a plurality of access devices in communication with the gateway. The broadband access gateway may distribute selected portions of the descriptive information, to permit authorized users of the access device to be aware of and access the multimedia information and services. Such a gateway may permit broadband network access via, for example, a personal cellular microcell, a personal area network (PAN), a wired or wireless wide area network (WAN), wireless local area network (WLAN) or other type of network located within a premises such as, for example, a home, office, business, or the like. Services that may be available via such a broadband gateway connection include, for example, access to the public switched telephone network (PSTN); Internet protocol (IP) phone access; extended access to commercial cellular and PCS networks such as, for example, TDMA, CDMA, and GSM; and access to and/or control of a variety of multimedia access devices or networked resources capable of providing streams of images, still pictures, video, and audio; to name only a few. Examples of multimedia information include streaming video, broadcast video, voice, digital data, text, digitized audio, digitized still images, digitized video, and digitized music. The merging of these various types of networks may enable transparent communication of all types of media between access devices, which may be coupled in a wired or wireless fashion to one or more of these networks. In an embodiment of the present invention, access to services available through a wireless broadband gateway may be simplified, permitting their use by a wider group of users of access devices in, for example, homes, offices, and businesses.

Figure 1:
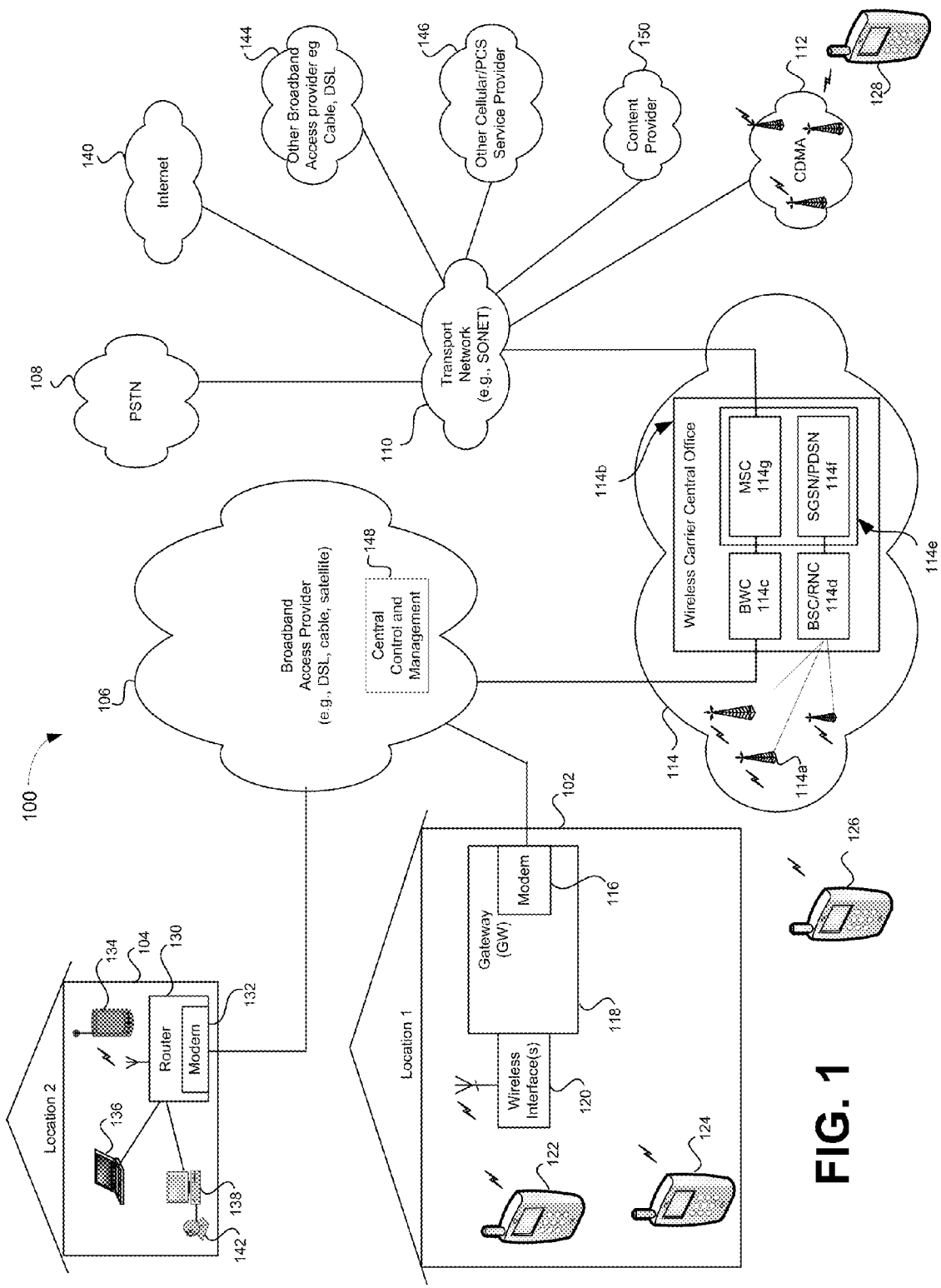
FIG. 1 is a block diagram illustrating an architecture of an exemplary communications system in which a representative embodiment of the present invention may be practiced.

FIG. 1 is a block diagram illustrating an architecture of an exemplary communications system in which a representative embodiment of the present invention may be practiced. Referring to FIG. 1, there is shown a first location 102, a second location 104, a broadband access provider (BAP) 106, public switched telephone network (PSTN) 108, a transport network 110, wireless networks including CDMA network 112 and GSM network 114, and access devices 126 and 128. The first location 102 comprises a gateway 118 having a modem 116, a wireless interface(s) block 120, and the access devices 122, 124. The access devices 122, 124, 126, 128 may comprise, for example, a mobile multimedia handset having a high level of functionality such as, for example, that of one or more of a digital video or still camera, a portable audio (MP3) player, a personal digital assistant, and a voice handset. The access devices 122, 124, 126, 128 may be capable of operating using, for example, a personal area network and/or wireless local area network compliant with, for example, Bluetooth, IEEE 802.11a/b/g/n, and/or IEEE 802.15.3a ultra-wideband standards. The second location 104 comprises a router 130 having a modem 132, and a plurality of wireless access devices. The plurality of wireless access devices at the second location 104 may comprise a personal computer (PC) 138, a laptop 136 and a wireless personal digital assistant (PDA) 134. A peripheral such as a digital camera 142 may be coupled to the personal computer 138. Other peripherals such as printers, digital scanners, speakers, and the like, which are not shown, may also be coupled to the personal computer 138 and/or laptop 136. The wireless interface block 120 may comprise a plurality of interfaces such as a Bluetooth interface, an IEEE 802.15.3a ultra-wideband interface, and any combination of an IEEE 802.11a, b, g and/or n interface.

FIG. 1 also comprises an "other broadband access provider" block 144, an "other cellular/PCS service provider" block 146, a central control and management block 148, and content provider 150. The "other broadband access provider block 144" may be, for example, a cable, DSL, or other type of broadband access provider. The central control and management block 148 may comprise suitable logic, circuitry and/or code that may be adapted to handle content delivery and security functions such as authentication, validation, key or certificate management, and authorization. The central control and management block 148 may also be adapted to handle provisioning and service management. In a representative embodiment of the present invention, the central control and management block 148 may establish communications links with, for example, the gateway 118, the broadband access provider 106, the other broadband access provider 144, the other cellular/PCS service provider 146, the CDMA network 112, and the GSM network 114 using actual or virtual connections.

The broadband access provider 106 may be, for example, a cable operator, telephone company, or satellite operator providing Internet access along with other communication services. In instances where BAP 106 is a telephone company, broadband service to locations 102, 104 may be provided via DSL or other broadband access technology. Accordingly, the modems 116, 132 may be DSL modems. In instances where BAP 106 is a cable operator, broadband service to locations 102, 104 may be provided via cable. Accordingly, the modems 116, 132 may be DOCSIS compliant or other type of cable modem. Given the rapid decrease in the cost of leased telephone lines over the past decade or more, the connection to the location 102, 104 may also be T1 or T3 connections. For example, a switch located at a central office (CO) (not shown) may be utilized to couple a T1 or T3 connection between the second location 104 and the PSTN 108.

The gateway 118 may comprise an integrated DSL modem, cable modem or other high-speed modem that may be required for handling a connection such as a T1 or T3 connection. Alternatively, the gateway 118 may be coupled to an external DSL modem, cable modem or other high-speed modem that may be capable of handling connections such as a T1 or a T3 connection. The gateway 118 may be adapted so that it has access to protocol stack information that may be related to the GSM and/or CDMA networks 114, 112, respectively. The gateway 118 may also be adapted to provide protocol support for communication with "other cellular/PCS service provider" block 146.

Each of the CDMA and GSM networks 112, 114 may comprise a plurality of cell sites (a/k/a cellular towers) that are located in geographical cells within each of the networks. Within the GSM network 114, each of the cell sites such as, for example, cell site 114a may comprise a base transceiver station (BTS), and one or more base transceiver stations (BTSs) may be coupled to wireless carrier central office 114b. The wireless carrier central office 114b may comprise a base station controller/radio network controller (BSC/RNC) such as BSC/RNC 114d. One or more base station controllers/radio network controllers (BSCs/RNCs) may be coupled to the core network 114e, that comprises a network edge switch called a mobile switching center (MSC), such as MSC 114g, and a serving GPRS support node (SGSN)/packet data serving node (PDSN) 114f, of the GSM network 114. The mobile switching center may be coupled to, for example, the PSTN 108 via the transport network 110. As an access device moves out of range of a first cell site to within range of a second cell site, the decrease signal power received from the first cell site and the increase in signal power received from the second cell site causes initiation of handoff of a call from the first cell site to the second cell site. In cases where there is no second cell site to handoff to, the call may be maintained by the first cell site power until it is attenuated to a threshold where it is no longer feasible to maintain the call. At the point where the power reaches or falls below this threshold, the call may drop and any related call resources may be relinquished. In a home and/or office environment, it may be desirable to have a second network to which the call may be handed off to.

As an illustration, a user may be on their way home and as the user approaches their home, the signal may fall below a minimum signal power threshold that is required to maintain a call. However, instead of dropping the call, the call may be handed off to, for example, a PAN or a wireless local area network (WLAN) that may be located within the user's home or an unlicensed wireless access system that may be located in the user's home. For example, with reference to FIG. 1, as access device 126 migrates from the vicinity of the serving cell site 114a in GSM network 114 towards the wireless interface 120 in the first location 102, the call may be handed off from the cell site 114a GSM network 114 to the wireless interface 120 coupled to the gateway (GW) 118 at the first location 102. Accordingly, instead of the call being dropped, the call has been seamlessly handed off and is now being handled by the gateway 118 via the wireless interface 120. The resulting wireless data may then be communicated to the GSM network 114 via the broadband connection to the BAP 106 which is connected to the broadband wireless local area network controller (BWC) 114c.

In this illustration, the user is handed off to their PAN, WLAN, or other network located within their home. However, the user could also have been handed off to another network system such as a neighbor's network. In any case, a gateway coupled to the wireless interface which is providing service to the user may communicate at least a portion of the data to, for example, the cable or DSL BAP 106, the GSM network 114, CDMA network 112, other broadband access service provider 144, other cellular/PCS service provider 146 and central control and management block 148. The user may be provided with a notification that indicates the presence of the PAN, WLAN, or other unlicensed network. For example, an icon representative of a personal area network may be displayed on the screen of the access device 126 once a soft or hard handoff is achieved from a serving cell site in GSM network 114 to the wireless interface 120 at the first location 102. A special tone or other audio alert may also be utilized to indicate that the call has switched to the wireless interface 120.

In instances where the gateway 118 detects a compatible access device that may be within the range of the wireless interface 120, the gateway 118 may immediately advertise its available services to the access device. In this regard, the gateway 118 may be adapted to transmit service advertisements to the access device in order to alert a user of the access device of the types of services that are being offered by the gateway 118. Signals containing icons representative of the services may be transmitted to and displayed on a screen of the access device and/or audio alerts may be utilized to notify the user of these services.

In another embodiment of the invention, quality of service (QoS) may also be advertised by the gateway 118. For example, when a user is being serviced by the wireless interface 120, the gateway 118 may advertise that stereo audio is available.

Access devices may be pre-registered so that when they are within the range of the wireless interface 120, the gateway 118 may automatically recognize them. For the pre-registration, an administrator of the gateway 118 at the first location 102 may register access devices that are allowed to access the gateway 118 when they are within the range of the wireless interface 120. Pre-registration may be done prior to the access device accessing the gateway 118. During pre-registration, an administrator or owner of the gateway 118 may enter registration or configuration information such as device IDs of access devices belonging to friends and/or family member's into a registration database associated with the gateway 118. As a result, these devices will be allowed to access at least a portion of the services offered by the gateway 118 whenever they attempt to access the gateway 118 by pressing a single button, for example. Opportunistic registration permits a user of an access device to register with the gateway 118 automatically with little or no effort on the part of the user. In this regard, registration information may be sent to the gateway 118 from an access device during an initial access and the gateway 118 may chose to accept or deny the registration. The registration information may be automatically or manually sent to the gateway 118.

In certain instances, an access device may not have been pre-registered to access the network. In this case, one button access may be provided. A single button such as a hard coded button or software-enabled button on an access device may be programmed to transmit identifying information from the access device to the gateway 118. The gateway 118 may utilize this transmitted identifying information to grant or deny access to its services. For example, one button may be programmed to contain access device identifying information related to accessing the services provided by gateway 118 at the first location 102. The gateway 118 may also be adapted to utilize digital certificates to authenticate access devices.

An interactive process may also be provided, whereby the gateway 118 may prompt or request particular information, for example a password from an access device requiring network access. If the particular information is received, then access to at least some of the services provided by the gateway 118 may be granted and if not, the access to at least some of the gateway's services may be denied.

In another embodiment of the invention, the one button access may be provided via software-enabled button (soft button) or hardware-enabled button (hard button). In this regard, the software button may be displayed on a screen of an access device.

A "walled garden" approach may be utilized to provide access to the services that may be offered by a particular gateway, for example, gateway 118. Under the walled garden approach, when an access device first registers or is identified, a basic set of services may be provided by the serving gateway 118 to the access device 124. The basic services offered may vary among each gateway. At least some of the basic services that are provided by a gateway such as gateway 118, may be offered without authenticating the access device 124. However, other services may only be offered if an access device such as access device 124 is properly authenticated. These services that are offered may be services that were advertised by the gateway 118.

In an aspect of the invention, access to additional services may be granted based on, for example, user identity, access device identity and or user input. The services offered to an access device by a gateway may be arranged in a hierarchical structure such as a tier. For example, in a first tier, a user may be prompted to enter membership information such as a member identification number. Upon authentication of the membership identification number, the first tier may provide restricted access with pop-up advertisements that may not be disabled. In a second tier, for example, a user may be prompted to enter a password. Upon authentication of the password, second tier information may provide restricted access to gateway services without pop-up advertisements. In a third tier, for example, entering billing information such as an account number or credit card or check card number may provide unlimited and/or unrestricted access to all the services offered by a gateway. A fourth tier may provide only operating instruction and information for guests.

An administrator of the gateway may establish the type of access provided by the walled garden. For example, if the first location 102 is a hotspot at a Café, the provider of the gateway may establish the service access levels or tiers that may be provided by the gateway 118.

When an access device is within the range of the gateway 118, wireless service is handed off from a serving cell site 114a in the GSM network 114 to the gateway 118. The access device may be authenticated by the gateway 118 and permitted to access at least some of the services offered by the gateway 118. Once the access device is authenticated, at least a portion of the information on the access device may be made available as a networked resource via the gateway 118. A user of the access device may chose whether information on the access device may be made available to the gateway and if so, that information which will be made available, and that information which will be unavailable to the gateway 118. In this regard, where information is made available, the gateway 118 may maintain a list of the resources that may be available on access devices that may be coupled to the gateway 118. For example, a list of contact information, calendar information, audio files, video file and/or data files stored on the access device may be sent to the gateway 118.

The resources that are available on the access device may also be advertised to other access devices that may be in communication with the gateway 118. Advertisement of the resources that may be available on an access device may be restricted to, for example, a list of particular devices, a particular type of devices or to a particular user. Accordingly, a user may have to be properly authenticated prior to certain information being made available to the user. Additionally, advertisement of the resources may cause certain icons representative of the resources to be displayed on other access devices. In a similar manner, icons representative of the resources that may be available on these other access devices may also be presented on the access device.

An access device may be provided with a welcoming screen that may allow a user of a device to sign up for either free or paid services. Once the signup is complete, subsequent access by the user may be authenticated by the gateway 118 utilizing the signup information. Whenever an access device registers with and/or is authenticated by the gateway 118, information on the access device may be updated and/or synchronized with information that may be on the gateway 118.

Devices within the location of the gateway 118 may be configured to register certain portions of their data content with the gateway 118 through a gateway registration process. Once data for these devices is registered to the gateway 118, the gateway may maintain a database, which keeps track of the data that is available, and its location. Accordingly, if the data previously stored in the database is no longer available, then information representative of the previously stored data may be removed from the database. Data from devices coupled to the gateway 118 such as on laptops, CD players, digital video disk (DVD) players, TIVO, personal video recorders (PVRs), personal digital assistants (PDAs) and other devices, may be registered with the gateway 118. This data may comprise audio, video, still pictures, and/or text.

At least a portion of the registered data may be made available to other network access devices via the gateway 118. In an aspect of the invention, the gateway 118 may be adapted to maintain a searchable list of data that may be available via the gateway. In this regard, the gateway may comprise a search engine that may be utilized to locate and distribute data that may be made available through the gateway 118. In another aspect of the invention, data may be made available to access devices via advertising by the gateway 118. Access devices may be configured to seek out particular data that may be of interest. Accordingly, an access device may be adapted to receive and process only those gateway advertisements may fit particular criteria. Those advertisements that may not fit the particular criteria may be discarded or ignored.

When an access device is within the range of the gateway 118, wireless service may be handed off from a serving cell site 114a in the GSM network 114 to the gateway 118. The access device may be authenticated by the gateway 118 and permitted to access at least some of the services offered by the gateway 118. Once the access device is authenticated, a user of the access device may have a desire to locate a particular video presentation. The user may access the search engine, which may have been advertised to the user's access device by the gateway 118. The search engine may appear on the display of the user's access device as an icon. The user may then activate a search by selecting the search engine icon, inputting a name of the video presentation and executing the search.

In another embodiment of the invention, the gateway may be adapted to classify information based on a given criterion. This classification may assist with locating information based on a particular criterion. In this regard, a user of the access device may be presented with a list of classifications and may select one, which may be of interest based on a particular criterion. This may narrow the focus of a search.

The gateway may also be utilized to facilitate seamless synchronization of data between devices that may be wired or wirelessly coupled to the gateway 118. For example, audio files located in a music folder on a PC coupled to the gateway 118 may be synchronized with a wireless media player coupled to a hot spot in an airport while a user of the wireless access media player waits to board a flight. In this regard, the gateway may determine what files need to be synchronized and control how the synchronization is accomplished. The same is true for files that may be downloaded from the PC to the wireless access media player, and for files that may be uploaded from the wireless access media player to the PC. Calendar and/or contact information may also be updated and/or synchronized with a mobile multimedia handset in a similar manner utilizing the gateway 118.

A location-aware service determines an approximate location of a network device and adapts delivery of a particular service application and/or content according to a quality of service criterion. The delivery of location-aware services may be controlled by the gateway 118. For example, a user of an access device may request playback of an audio clip via the gateway 118. After receiving the request for playback of the audio clip, the gateway 118 may determine that a channel between the gateway 118 and the user's access device may only be capable of maintaining a reduced playback rate. As a result, instead of sending 128 kbps encoded audio data, then the gateway may send 96 kbps data. Hence, in a case where the audio data was originally stored in 128 kbps sampled audio data, then the gateway 118 may transcode the 128 kbps sampled data to 96 kbps audio data.

In another illustrative embodiment of the invention, while the GSM network 114 is servicing the access device, lower compression rates may be utilized to provide service to the access device. However, when the access device roams within range of the wireless interface 120 and is being served by the gateway 118 through wireless interface 120, higher compression rates may be utilized. For example, audio data sampled at a data rate of 64 kbps may be utilized for playback on an MP3 enabled telephone while the phone is being serviced by a cell site 114a in the GSM network 114. However, once the MP3 enabled telephone is within the operating range of the wireless interface 120 and is being serviced by the gateway 118, the gateway 118 may automatically adapt to a higher data rate of, for example, 92 kbps or 128 kbps.

Automatic format conversion by the gateway 118 may include converting data from a first format to at least a second format suitable for delivery and/or display on an access device. This may permit data that would otherwise be incompatible with a first access device to be played on that first access device. For the location-aware services based on QoS, data was converted from a first format 128 kbps to a second format 96 kbps to achieve and/or maintain a particular QoS, but the data type remained the same. In this case, the audio format and/or its data type may be different. For example, if the audio format was MP3, then after the conversion, the format remained WAV and/or the sampling rate may have decreased from 128 kbps top 96 kbps.

In conventional wired caller ID systems, a name and/or directory number (DN) of a calling party may be transferred either in-band or out-of-band to a called party and may be displayed on the called party's caller ID display when a call is answered. In these conventional systems, the caller ID information is limited to a callers name, directory number (DN), general location and/or time of call. In wireless telephone systems, in order to save on bandwidth, only a caller's directory number is transferred and displayed to a calling party. However, if the calling party's directory number and name is stored in the called party's phone, then the stored name and stored directory number will be presented on a display of the called party's terminal. In this case, the stored directory number is compared with the transferred caller's directory number, and if a match occurs, then a name corresponding to the matching directory number is also displayed on the called party's terminal.

In accordance with an embodiment of the invention, the gateway 118 is adapted to determine the appropriate caller ID information that may be displayed in a called and/or calling party's caller ID. In this case, reverse caller ID information may be displayed on both a calling and a called parties terminal by the gateway 118.

If a called and/or calling device is a mobile multimedia handset and/or laptop, for example, contact or other personal information may be displayed the caller's and/or calling party's directory number. The level or amount of information that may be displayed may be varied. Certain sensitive information relating to either the called or calling party may be restricted from being displayed.

In current cellular communication systems, over the air (OTA) programming is utilized to program a cellular telephone during the provisioning process. In some instances, cellular providers have established websites that may be utilized or OTA programming. In this regard, a cellular subscriber may access the website and enter information such as the assigned directory number and the electronic serial number of the cellular telephone being programmed.

In accordance with a representative embodiment of the invention, an access device may be registered using over the air programming via the gateway 118. A user of an access device may send access device information to the gateway 118 using, for example, a default interface that may be presented to and displayed on a screen of the access device when the access device first enters the service area of the wireless interface 120. During registration, the capabilities of an access devices may be sent to the gateway 118 and may be shared with devices that may be coupled to the gateway 118.

Since the gateway acts as a registrar of information for all the access devices that may be wired or wirelessly coupled to it, the gateway may function as a personal digital assistant for any of these access devices. In an illustrative example, a first device, a first PC and a second PC are being serviced by the gateway 118. The first access device receives a call and the caller ID information shows the callers name, home directory number and home address. However, the first PC contains the business address for the caller and the second PC contains the monthly calendar information for the caller. Assume that the caller had a desire to setup a business meeting. In accordance with an aspect of the invention, the gateway 118 may be adapted to provide the business address of the caller to the first access device and also provide the caller's calendar to the first access device. In this manner, the network centrally provides all the information necessary for scheduling the meeting. In this example, the first PC may belong to the user of the first access device and the second PC may belong to the caller.

This concept may be extended to a look-up or 411 directory assistance on the Internet. The lookup may also be location dependent. In this regard, if a user is located in Hollywood and requests a hotel location, the gateway 118 may only cause the hotels that are located in Hollywood to be displayed to the user.

The gateway 118 may also be adapted to create profile information based on data usage. These created profiles may be utilized to create social networks for people having common interests. Accordingly, users may be permitted to post their interests and also select those people having similar interests based on the created profile. Based on the created profile information and the posted user interests, the gateway 118 may also generate a list of those people who have similar interest and also those users that may potentially have similar interests.

Given the capability to seamlessly operate an access device as one migrates from outside the home into the home, it is desirable to have a single device that may be adapted to control at least some of the devices that may be found within the home. In addition to its normal voice or data communication operating mode, an access device may be configured to operate as a universal remote that may be utilized to remotely control a plurality or other devices such as a TV, DVD, CD, Stereo, display monitor, or a combination thereof. Most access devices currently have an IR transmitter, which may be adapted to communicate with other IR receiver devices.

The access device may be used for wireless communication and for remotely controlling an electronic device with as a TV, CD/DVD recorder/player, or other device. The access device may also include at least one soft-button that may be enabled through the gateway 118 and may be utilized to control any other device that may be coupled to the gateway 118.

The gateway 118 is adapted to virtually aggregate data that may be visible from a plurality of access devices or other network devices. Although the gateway 118 may be adapted to store some service and content related information, the gateway 118 does not actually store copies of data that resides the access devices and/or other network devices that may be wired or wirelessly coupled to it. However, the gateway 118 may store, for example, metadata information that may be utilized to locate and access the information stored on the access devices and/or other network devices. The gateway is therefore adapted to function as a registrar of both service and content related information.

Whenever an access device registers with and/or is authenticated by the gateway 118, information may be collected from the access device and related metadata information may be updated and/or synchronized with information that may be currently stored on the gateway 118. Additionally, when a device is no longer being serviced by the gateway 118, associated information may be released from the gateway 118. In this regard, the virtual aggregations function performed by the gateway 118 guarantees that the most current information is accessible from the access devices.

Figure 2:
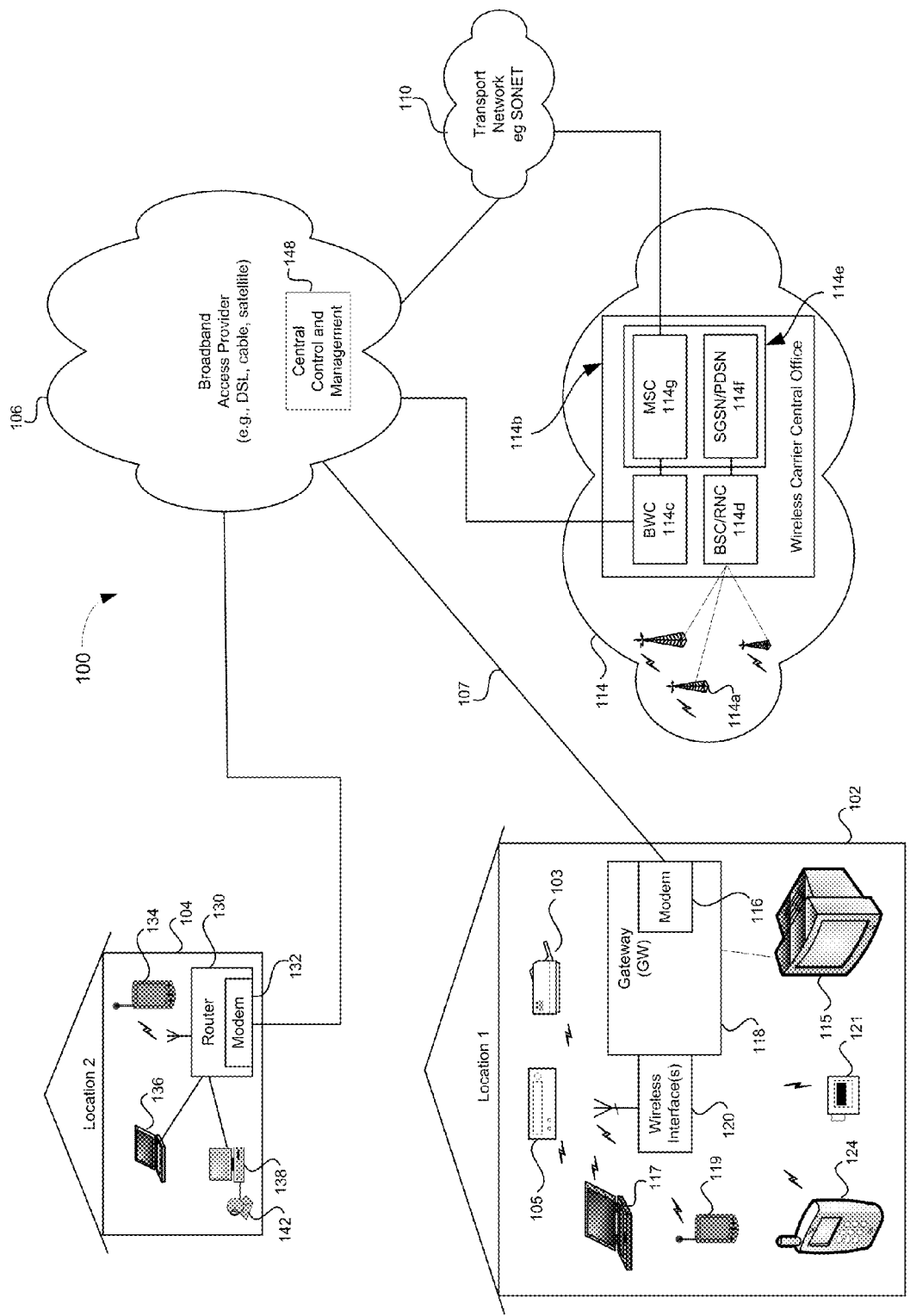
FIG. 2 shows a block diagram illustrating an exemplary communication system, in accordance with a representative embodiment of the present invention.

FIG. 2 shows a block diagram illustrating an exemplary communication system 100, in accordance with a representative embodiment of the present invention. The communication system 100 shown in FIG. 2 comprises a wireless interface 120, a gateway (GW) 118 with a modem 116, and an array of access devices such as, for example, a printer 103, a stereo receiver 105, a laptop 117, a wireless personal digital assistant (PDA) 119, and digital video camera 121, at location 102. The communication system 100 of FIG. 2 also comprises an access device 124 that may correspond, for example, to the access devices 122, 124, 126 of FIG. 1. A second location 104 within communication system 100 comprises a router 130 with a modem 132, and a plurality of wireless access devices. The plurality of access devices at the second location 104 may, for example, comprise a personal computer (PC) 138, a laptop 136, and a wireless personal digital assistant (PDA) 134. A peripheral such as, for example, a digital camera 142 may be coupled to the personal computer 138. Other peripherals such as, for example, printers, digital scanners, speakers, and the like, that are not shown in FIG. 2, may also be coupled to the personal computer 138 and/or laptop 136. The wireless interface 120 may comprise a plurality of interfaces such as, for example, a Bluetooth interface, a cellular interface, and any combination of an IEEE 802.11a, b, g, and/or n interface, and/or an IEEE 802.15.3a ultra-wideband interface. Although the following discussion refers frequently to the capabilities and actions of the gateway 118 and wireless interface 120, the same may be said of the router 130 with the modem 132 of FIGS. 1 and 2, for example, without departing from the spirit and scope of the present invention.

In accordance with a representative embodiment of the present invention, a wireless access device such as access device 124 may be mobile, and may move between the personal area network/wireless local area network coverage provided by wireless interface 120 at location 102, the wide area network coverage provided by, for example, GSM network 114, and the coverage provided by the router 130 and modem 132 at location 104. The location 102 may, for example, be the home of the user of the access device 124, the home of a friend or relative of the user of access device 124, or an office, business, etc., where the user of access device 124 may travel. The location 104 may, for example, be a second home of the user of access device 124, the home of a friend or relative, an office, or may have no personal or business relationship with the user of access device 124. In a representative embodiment of the present invention, the gateway 118 may comprise, for example, a set top box that may be coupled in a wireless or wired fashion to access devices such as, for example, a laptop computer or television, such as the laptop 117 and the television 115 of FIG. 2. Access to the communication bandwidth of a broadband network as previously described may be provided by the gateway 118 and the modem 116 to wired or wireless access devices in the vicinity of location 102, and via router 130 and modem 132 to wired or wireless access devices in the vicinity of location 104, as shown in FIG. 2. This architecture may provide extended access to wireless networks such as, for example, the GSM network 114, CDMA network 112, other cellular/PCS service provider 146, Internet 140 and public switched telephone network 108, of FIG. 1. The modem 116 is shown connected to a broadband access provider (BAP) 106 via a broadband connection 107. The broadband connection 107 may comprise, for example, a digital subscriber line (DSL) connection, a cable network connection, a satellite connection, a T1 or T3 network connection, or similar broadband communication link. The modem 116 is compatible with the broadband connection 107, and may be, for example, a DSL modem, a DOCSIS-compliant cable modem, a satellite service modem, or T1 or T3 compatible modem-type device. The broadband connection may provide access through BAP 106 to location 104, and via transport network 110 to, for example, GSM network 114.

In the example illustration of FIG. 2, a user of the access device 124 may or may not be engaged in communication with another system or subscriber accessible via the GSM network 114, or other wide area network of FIG. 1. Although the present example of FIG. 2 shows a GSM network 114, a representative embodiment of the present invention may be employed with respect to other wide area networks such as, for example, the CDMA network 112 and other cellular/PCS service provider 146, shown in FIG. 1.

When an access device such as, for example, the access device 124 of FIG. 2 moves into the coverage area of a personal area network of, for example, the wireless interface 120 and gateway 118, or the router 130, the access device 124 may be authenticated by the gateway 118 or router 130. The authentication may involve the sharing or exchange of identification and/or authentication information by the access device 124 with the gateway 118 or router 130. Details of an example of such an interaction are provided in U.S. patent application Ser. No. 11/039,020, entitled "Method And System For Providing Registration, Authentication, And Access Via A Broadband Access Gateway", filed Jan. 18, 2005, the complete subject matter of which is hereby incorporated herein by reference, in its entirety. Once the access device 124 has been authenticated to the gateway 118, the access device 124 may be permitted to exchange multimedia information and services available via the access devices in communication with the gateway 118, or via networks connected to the gateway 118. Information about the available multimedia information and services may be shared by and/or with the access device 124 via information exchanged by the access device 124 and the gateway 118 or router 130. Additional information about the advertising of such information may be found in U.S. patent application Ser. No. 11/021,294, entitled "Method And System For Extended Network Access Services Advertising Via A Broadband Access Gateway", filed Dec. 23, 2004, the complete subject matter of which is hereby incorporated herein by reference, in its entirety.

In various representative embodiments of the present invention, the access devices such as access device 124 in communication with the gateway 118 and router 130 of FIG. 2 may comprise, for example, a personal computer (PC), a laptop computer, a printer, a wireless personal digital assistant (PDA), a stereo receiver, a digital scanner, a CD player, a digital video disk (DVD) players, a TIVO, a personal video recorder (PVRs), a mobile multimedia handset, and an MP3 enabled telephone. Each of these devices may function as one or both of a provider and consumer of multimedia information and services. In a representative embodiment of the present invention, a gateway or router such as the gateway 118 or router 130 of FIG. 2 may authenticate itself to an access device such as the access devices described above, in order to gain access to multimedia information or services that may be available through the access device. Although many of the examples presented herein described access devices employing wireless communication links, aspects of the present invention also apply to access devices employing wired communication links.

For example, in one representative embodiment of the present invention, a user may be listening to music while driving home from work, using an access device 124 such as, for example, a mobile multimedia handset containing an MP3 player. Upon reaching the home or office destination, a wireless broadband access gateway such as, for example, the gateway 118 of FIG. 2, may detect the presence of the access device 124 (e.g., mobile multimedia handset), and the gateway and the mobile multimedia handset may exchange identification information. The identification information may comprise, for example, access device identifiers, network addresses, media access control (MAC) addresses, electronic serial numbers, personal identification numbers (PINs) of users, and digital certificates. The identification information may enable an access device such as the mobile multimedia handset to determine what, if any, details of the multimedia information and services it has to offer that should be shared or "advertised" with the wireless broadband access gateway. In this example, the access device 124 (e.g., mobile multimedia handset) may interact with the wireless broadband access gateway using, for example, a Bluetooth, IEEE 802.11a/b/g or n, IEEE 802.15.3a ultra-wideband, or other wireless link. The gateway may then know of the MP3 player, and the songs that are stored on the mobile multimedia handset and that are available for playback, etc. Upon receiving information about the multimedia information (e.g., songs) and services (e.g., record, playback, catalog, etc.) that are available from the access device 124 (e.g., mobile multimedia handset with MP3 player), a wireless broadband access gateway in accordance with a representative embodiment of the present invention may share that information with other access devices with which it is in communication. The nature of the information that is shared may depend upon details in the identification information exchanged during authentication, and identification information it may have received from those other access devices.

In another of a representative embodiment of the present invention, a user may enter the personal area network/wireless wide area network coverage area of a wireless broadband access gateway such as, for example, gateway 118 or router 130 of FIG. 2, accompanied by an access device such as, for example, a digital video camera 121. The wireless broadband access gateway may detect the presence of the digital video camera 121, and the gateway 118 and digital video camera 121 may exchange identification information. The identification information may comprise, for example, access device identifiers, network addresses, media access control (MAC) addresses, electronic serial numbers, personal identification numbers (PINs) of users, and digital certificates. The identification information may enable an access device such as those described above to determine what details of the multimedia information and services it has to offer that should and should not be shared or "advertised" with another access device via the wireless broadband access gateway. Upon receiving information about the multimedia information and services available from the digital video camera 121 of this example, the wireless broadband access gateway may provide that information to other access devices with which it is in communication, depending upon identification information exchanged during authentication with the digital video camera 121, and that received from other access devices. In this example, the digital video camera 121 may communicate with the wireless broadband access gateway 118, and the wireless broadband access gateway 118 may become aware of the digital video camera 121, the multimedia information that may be available, and the services (video record, playback, etc.) that the camera may support. Upon receiving information about the multimedia information (e.g., images or video) and services (e.g., record, playback, catalog, etc.) available from the access device (e.g., the digital video camera 121), the wireless broadband access gateway 118 may share that information with other access devices with which it is in communication, depending upon identification information it has exchanged with those other access devices.

Figure 3:
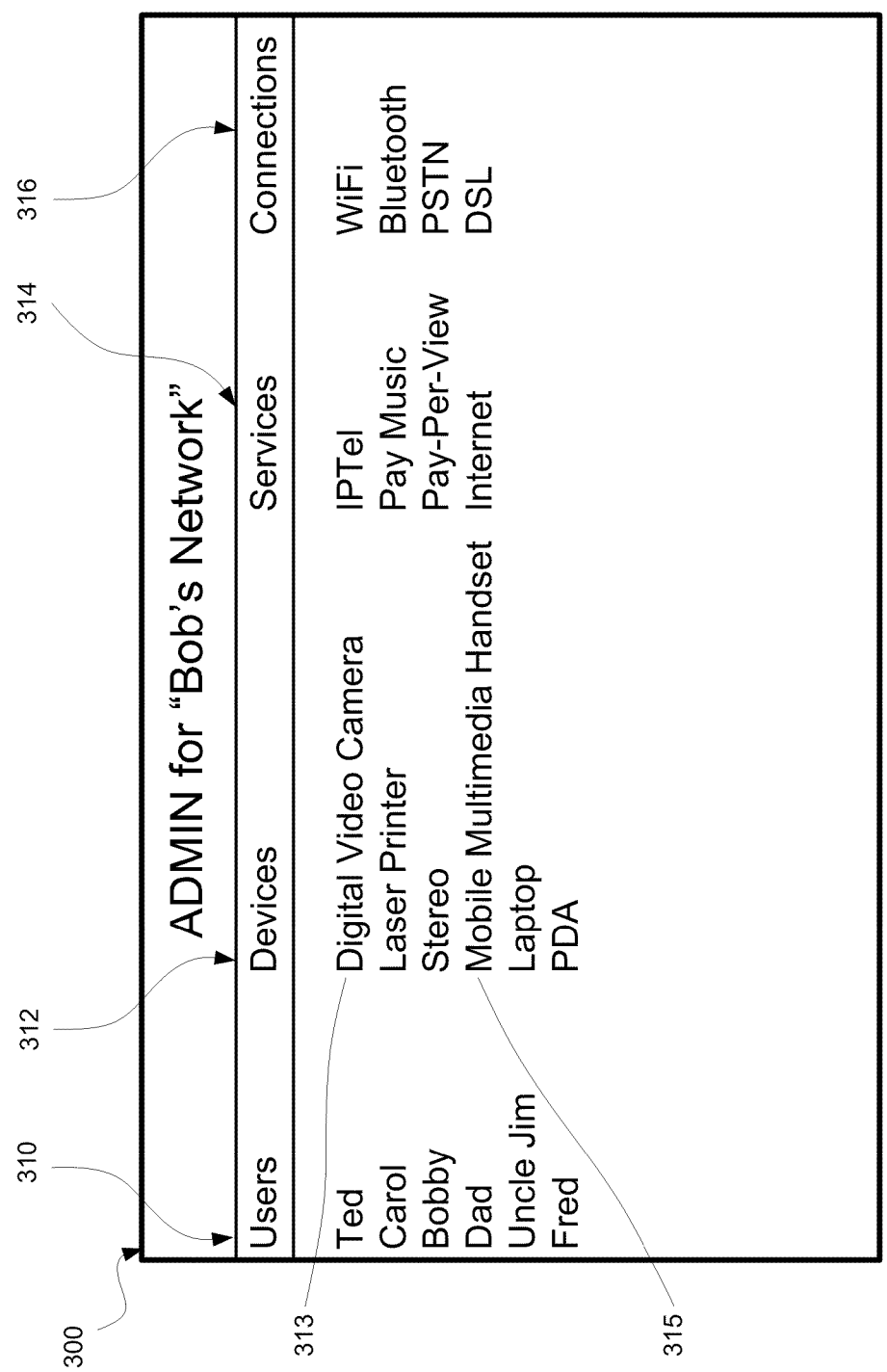
FIG. 3 shows an illustration of an exemplary administration screen that may correspond to a screen displayed on an access device in the communication system shown in FIG. 2, for example, in accordance with a representative embodiment of the present invention.

FIG. 3 shows an illustration of an exemplary administration screen 300 that may correspond to a screen displayed on an access device in the communication system 100 shown in FIG. 2, for example, in accordance with a representative embodiment of the present invention. The administration screen 300 of FIG. 3 shows information that may be collected by a wireless broadband access gateway such as, for example, the gateway 118 or router 130 of FIG. 2. The administration screen 300 shown in FIG. 3 comprises columns of information using the classifications "Users" 310, "Devices" 312, "Services" 314, and "Connections" 316. The "Users" 310 column lists the users that are currently registered or known to the wireless broadband access gateway. The "Services" 314 column displays the services that are currently available from the wireless broadband access gateway itself. The "Connections" 316 column lists the modes of communication available to the wireless broadband access gateway. For example, the wireless broadband access gateway of the illustration of FIG. 3 supports WiFi (IEEE 802.11), Bluetooth, PSTN (public switched telephone network), and DSL (digital subscriber line) connections to networks and access devices.

The administration screen 300 illustrated in FIG. 3 also comprises a "Devices" 312 column, that lists a number of access devices such as, for example, the access device 124, that are known to the wireless broadband access gateway. For example, the wireless broadband access gateway of the illustration of FIG. 3 is aware of, and is capable of communication with a digital video camera that may correspond, for example, to the digital video camera 121 of FIG. 2, a laser printer that may correspond, for example, to the laser printer 103 of FIG. 2, and a stereo that may correspond, for example, to the stereo 105 of FIG. 2. The "Devices" 312 column of FIG. 3 also lists a mobile multimedia handset that may correspond, for example, to the access device 124 of FIG. 2, a laptop that may correspond, for example, to the laptop 117 of FIG. 2, and a PDA (personal digital assistant) that may correspond, for example, to the PDA 119 of FIG. 2. In an embodiment of the present invention, a user having administrative privileges for the gateway 118 or router 130 may select any of the entries in the "Users" 310, "Devices" 312, "Services" 314, and "Connections" 316 columns of the exemplary administration screen 300 in order to gain access to additional information about that particular item.

Figure 4A:
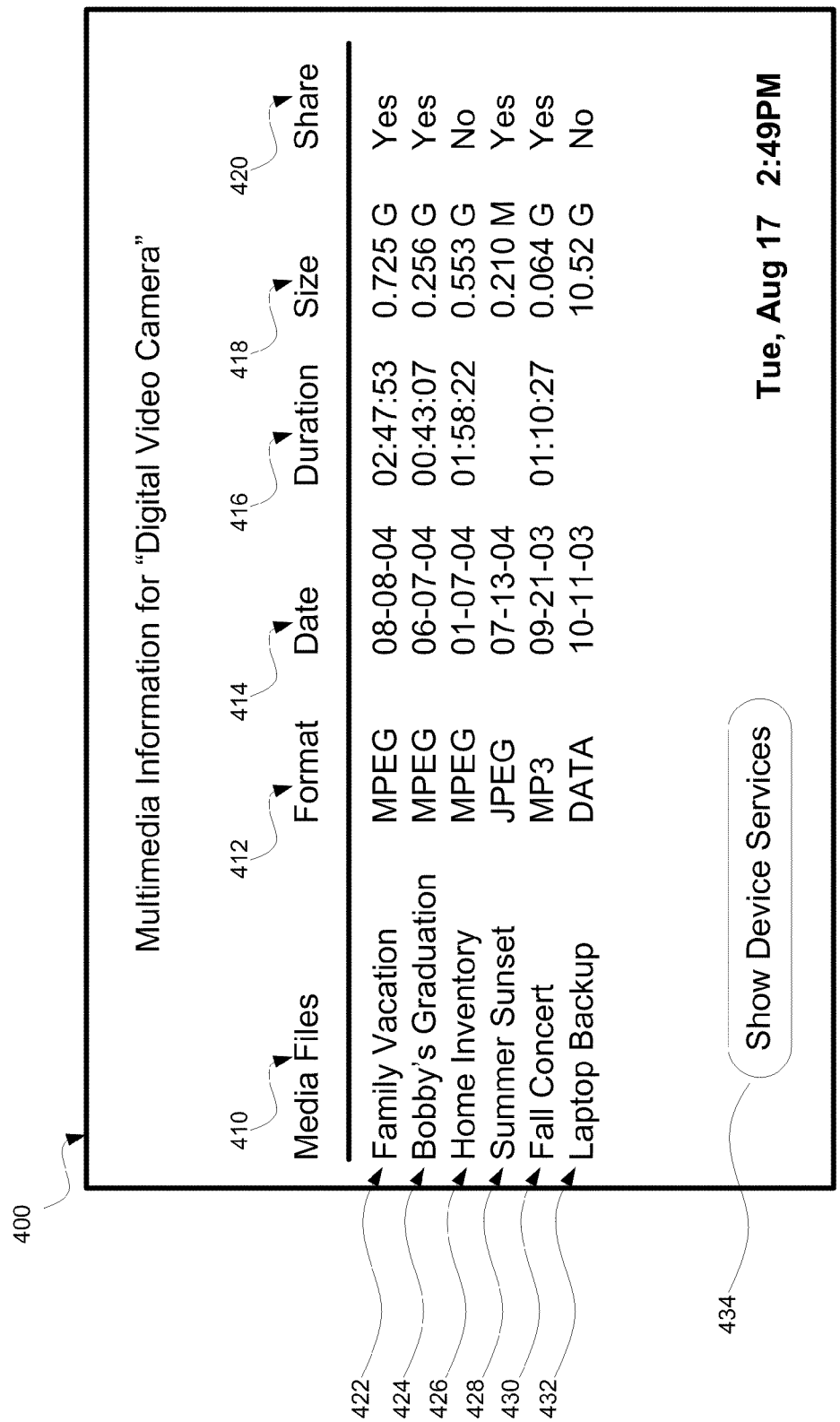
FIG. 4A shows an exemplary multimedia information screen that may be accessed by selecting the "Digital Video Camera" entry of the "Devices" column of FIG. 3, for example, and that may contain information corresponding to the multimedia information stored on the digital video camera of FIG. 2, for example, in accordance with a representative embodiment of the present invention.

FIG. 4A shows an exemplary multimedia information screen 400 that may be accessed by selecting the "Digital Video Camera" entry 313 of the "Devices" 312 column of FIG. 3, for example, and that may contain information corresponding to the multimedia information stored on the digital video camera 121 of FIG. 2, in accordance with a representative embodiment of the present invention. The multimedia information screen 400 may, for example, be accessed and displayed by any of a number of access devices in communication with the wireless broadband access gateway such as, for example, the access device 124, the laptop computer 117, the personal computer 138 and the wireless PDA 134, of FIG. 2. Although the multimedia information screen 400 is shown in a tabular format, the particular format and content of the multimedia information screen 400 shown in FIG. 4A do not represent limitations of the present invention, as other formats and content may be displayed without departing from the spirit and scope of the present invention. The multimedia information screen 400 comprises columns of information "Media Files" 410, "Format" 412, "Date" 414, "Duration" 416, "Size" 418, and "Share" 420. Entries in the "Media Files" 410 column identify the names of media files known to a wireless broadband access gateway such as, for example, the gateway 118 or router 130 of FIG. 2. The "Format" 412, "Date" 414, "Duration" 416, "Size" 418, and "Share" 420 columns provide the media format, the date of recording, the length, the size in bytes, and whether the information is to be shared, respectively, for the associated media file identified in the "Media Files" 410 column. For example, a video media file named "Family Vacation" 422 may have been stored in MPEG (Moving Picture Experts Group) format on Aug. 8, 2004. The video recording is two hours, 47 minutes, 53 seconds in length, and occupies 0.725 gigabytes of storage, and is sharable. Another example shown in FIG. 4A is an audio media file named "Fall Concert" 430 that was stored in MP3 (MPEG-2, layer 3) format on Sep. 21, 2003. The audio recording is one hour, 10 minutes, 27 seconds in length, and occupies 0.064 gigabytes of storage. This file is also sharable.

Figure 4B:
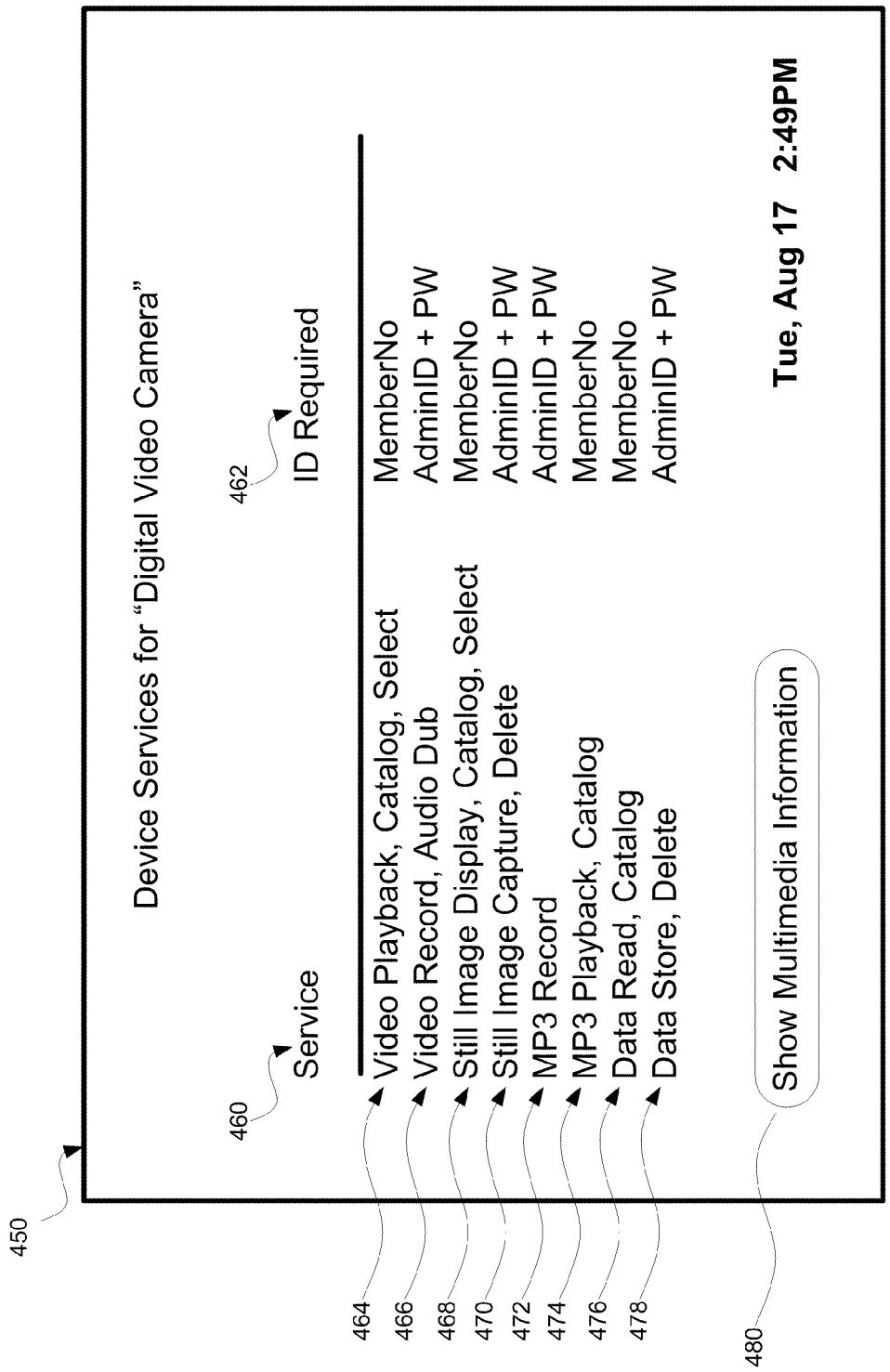
FIG. 4B shows an exemplary device services screen containing information corresponding to the multimedia services available on the digital video camera of FIG. 2, for example, in accordance with a representative embodiment of the present invention.

FIG. 4B shows an exemplary device services screen 450 containing information corresponding to the multimedia services available on the digital video camera 121 of FIG. 2, for example, in accordance with a representative embodiment of the present invention. The device services screen 450 may, for example, be accessed by selecting the "Show Device Services" button 434 of FIG. 4A. The user may return to display the multimedia information of the current access device by selecting the "Show Multimedia Information" button 480 of Device Services screen 450 of FIG. 4B. The device services screen 450 of FIG. 4B may be accessed using any of a number of access devices in communication with the wireless broadband access gateway such as, for example, the access device 124, the laptop computer 117, the personal computer 138 and the wireless PDA 134, of FIG. 2. Although the device services screen 450 is shown in a tabular format, the particular format and content of the device services screen 450 shown in FIG. 4B do not represent limitations of the present invention, as other formats and content may be displayed without departing from the spirit and scope of the present invention. The device services screen 450 comprises columns of information "Service" 460 and "ID Required" 462. Entries in the "Service" 460 column identify the types of services available from, in this example, a "Digital Video Camera" that may correspond to the digital video camera 121 of FIG. 2. The second column, "ID Required" 462, lists for each service offered by the selected access device, the type of identification or authorization required for a user to make use of the service. For example, for a user to have access to the "Video Playback, Catalog, Select" services 464 of the "Digital Video Camera" access device, a user may be required to register a "MemberNo" with the wireless broadband access gateway. To further illustrate, access to the "MP3 Record" service 472 of the "Digital Video Camera" access device may require that the user be identified as having provided "AdminID+PW" (administrative identifier with password) identifier to the wireless broadband access gateway.

Figure 5A:
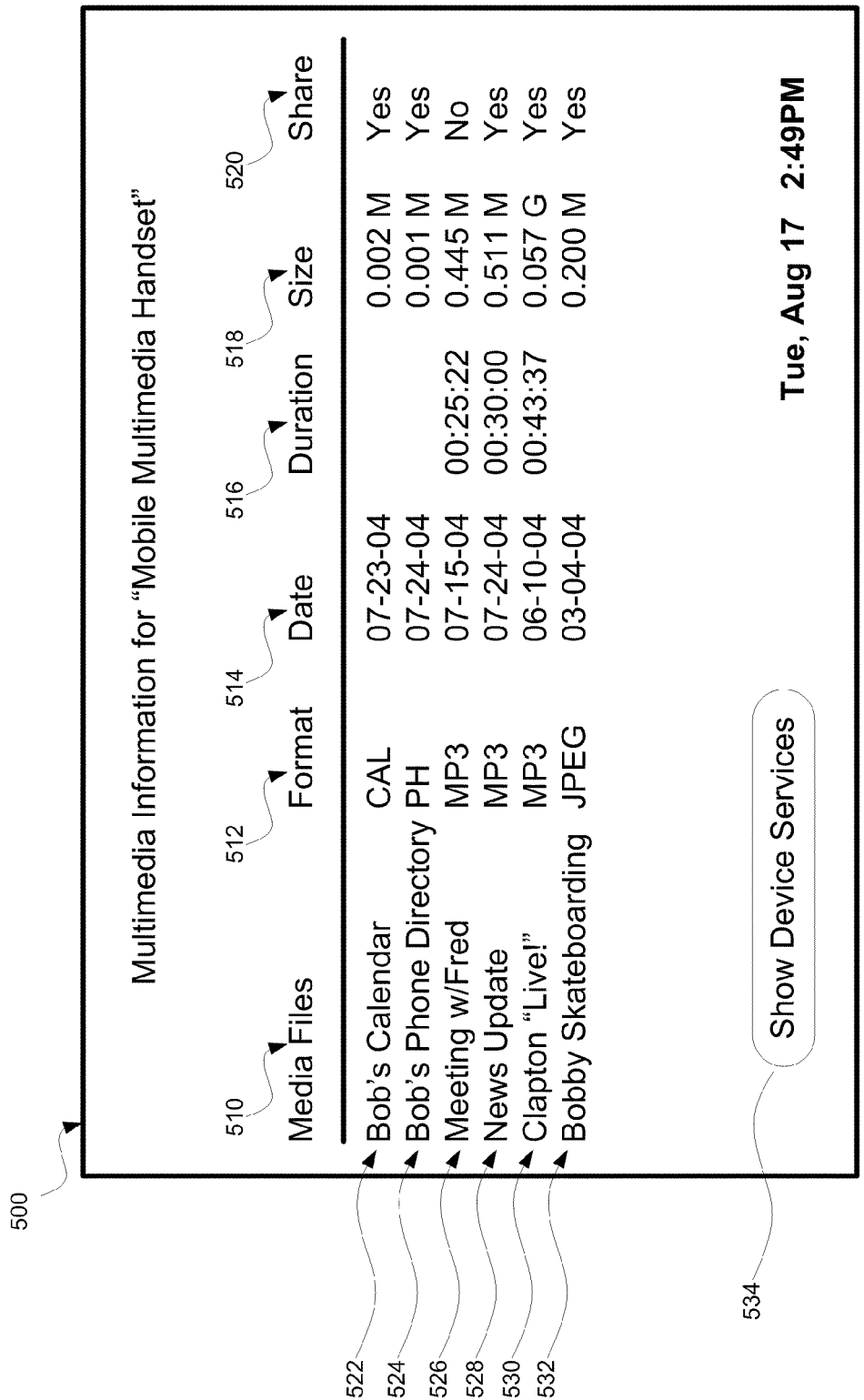
FIG. 5A shows an exemplary multimedia information screen that may be accessed by selecting the "Mobile Multimedia Handset" entry of the "Devices" column of FIG. 3, for example, and that may contain information corresponding to the multimedia information stored on a mobile multimedia handset that may be represented by the access device of FIG. 2, for example, in accordance with a representative embodiment of the present invention.

FIG. 5A shows an exemplary multimedia information screen 500 that may be accessed by selecting the "Mobile Multimedia Handset" entry 315 of the "Devices" 312 column of FIG. 3, for example, and that may contain information corresponding to multimedia information stored on a mobile multimedia handset that may be representative of the access device 124 of FIG. 2, for example, in accordance with a representative embodiment of the present invention. The multimedia information screen 500 may, for example, be accessed and displayed by any of a number of access devices in communication with the wireless broadband access gateway such as, for example, the laptop computer 117, the personal computer 138, and the wireless PDA 134, of FIG. 2. Although the multimedia information screen 500 is shown in a tabular format, the particular format and content of the multimedia information screen 500 shown in FIG. 5A do not represent limitations of the present invention, as other formats and content may be displayed without departing from the spirit and scope of the present invention. The multimedia information screen 500 comprises columns of information "Media Files" 510, "Format" 512, "Date" 514, "Duration" 516, "Size" 518, and "Share" 520. As in the example of FIG. 4A, the entries in the "Media Files" 510 column identify the names of media files known to a wireless broadband access gateway such as, for example, the gateway 118 or router 130 of FIG. 2. The "Format" 512, "Date" 514, "Duration" 516, "Size" 518, and "Share" 520 columns provide the media format, the date of recording, the length, the size in bytes, and whether the information is to be shared, respectively, for the associated media file identified in the "Media Files" 510 column. For example, a calendar media file named "Bob's Calendar" 522 is shown as having been stored in CAL (e.g., proprietary) format on Jul. 23, 2004. The calendar media file occupies 0.002 megabytes of storage, and is sharable. Another example shown in FIG. 5A is an audio media file named 'Clapton "Live!"' 530 that was stored in MP3 (MPEG-2, layer 3) format on Jun. 10, 2004. The audio recording is 43 minutes, 37 seconds in length, and occupies 0.057 gigabytes of storage. This file is also sharable.

Figure 5B:
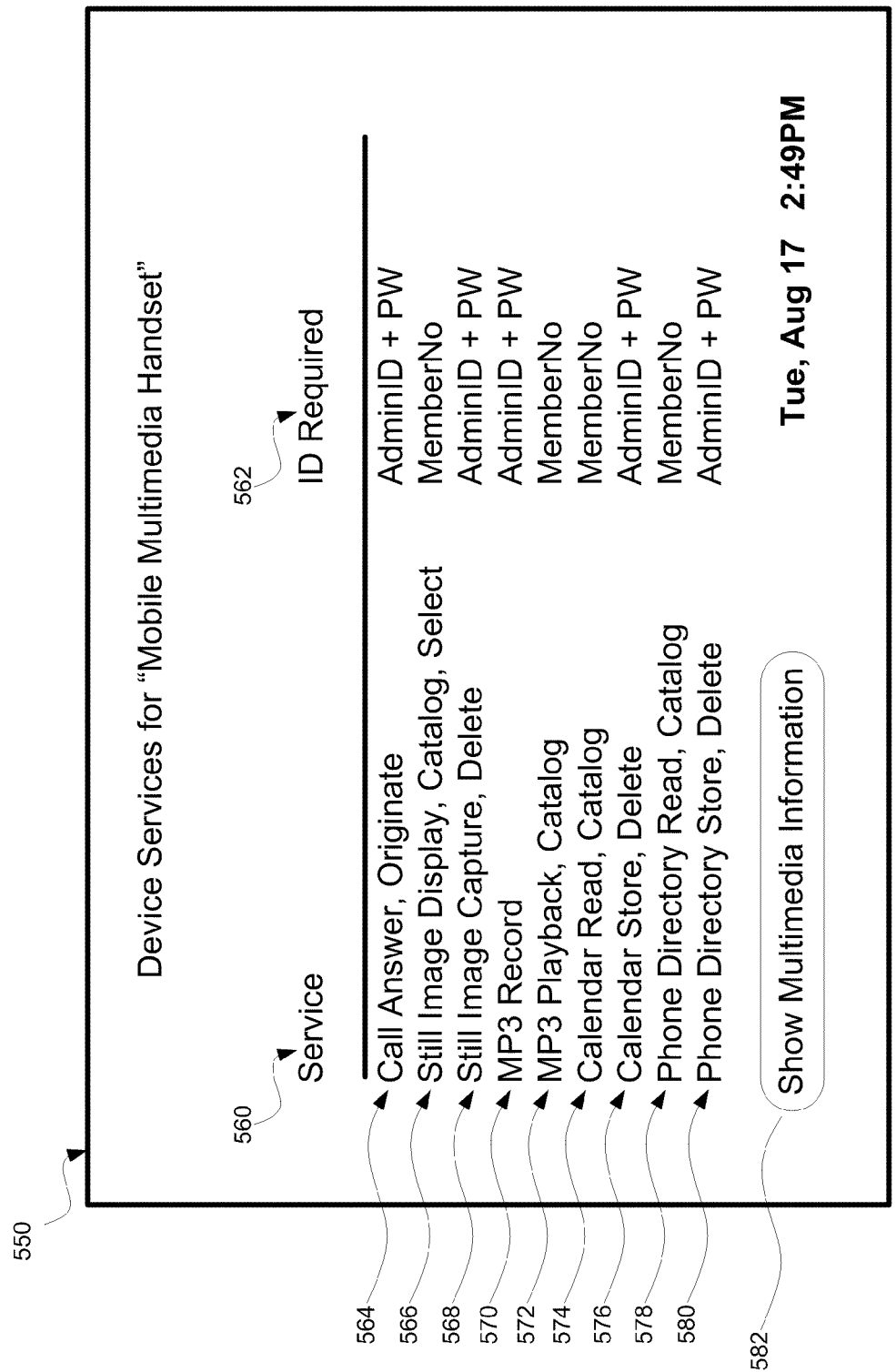
FIG. 5B shows an exemplary device services screen containing information corresponding to the multimedia services available on the mobile multimedia handset referred to in the description of FIG. 5A, for example, in accordance with a representative embodiment of the present invention.

FIG. 5B shows an exemplary device services screen 550 containing information corresponding to the multimedia services available on the mobile multimedia handset referred to in the description of FIG. 5A, for example, in accordance with a representative embodiment of the present invention. The device services screen 550 may, for example, be accessed by selecting the "Show Device Services" button 534 of FIG. 5A. The user may return to display the multimedia information of the current access device by selecting the "Show Multimedia Information" button 580 of Device Services screen 550 of FIG. 5B. The device services screen 550 of FIG. 5B may be accessed using any of a number of access devices in communication with the wireless broadband access gateway such as, for example, the access device 124, the laptop computer 117, the personal computer 138 and the wireless PDA 134, of FIG. 2. Although the device services screen 550 is shown in a tabular format, the particular format and content of the device services screen 550 shown in FIG. 5B do not represent limitations of the present invention, as other formats and content may be displayed without departing from the spirit and scope of the present invention. The device services screen 550 comprises columns of information "Service" 560 and "ID Required" 562. Entries in the "Service" 560 column identify the types of services available from, in this example, a "Mobile Multimedia Handset" that may correspond to the access device 124 of FIG. 2. The second column, "ID Required" 562, lists for each service offered by the selected access device, the type of identification or authorization required for a user to make use of the service. For example, for a user to have access to the "Still Image Display, Catalog, Select" services 566 of the "Mobile Multimedia Handset" access device, a user may be required to register a "MemberNo" with the wireless broadband access gateway. To further illustrate, access to the "Phone Directory Store, Delete" service 580 of the "Mobile Multimedia Handset" access device may require that the user be identified as having provided "AdminID+PW" (administrative identifier with password) identifier to the wireless broadband access gateway.

Figure 6:
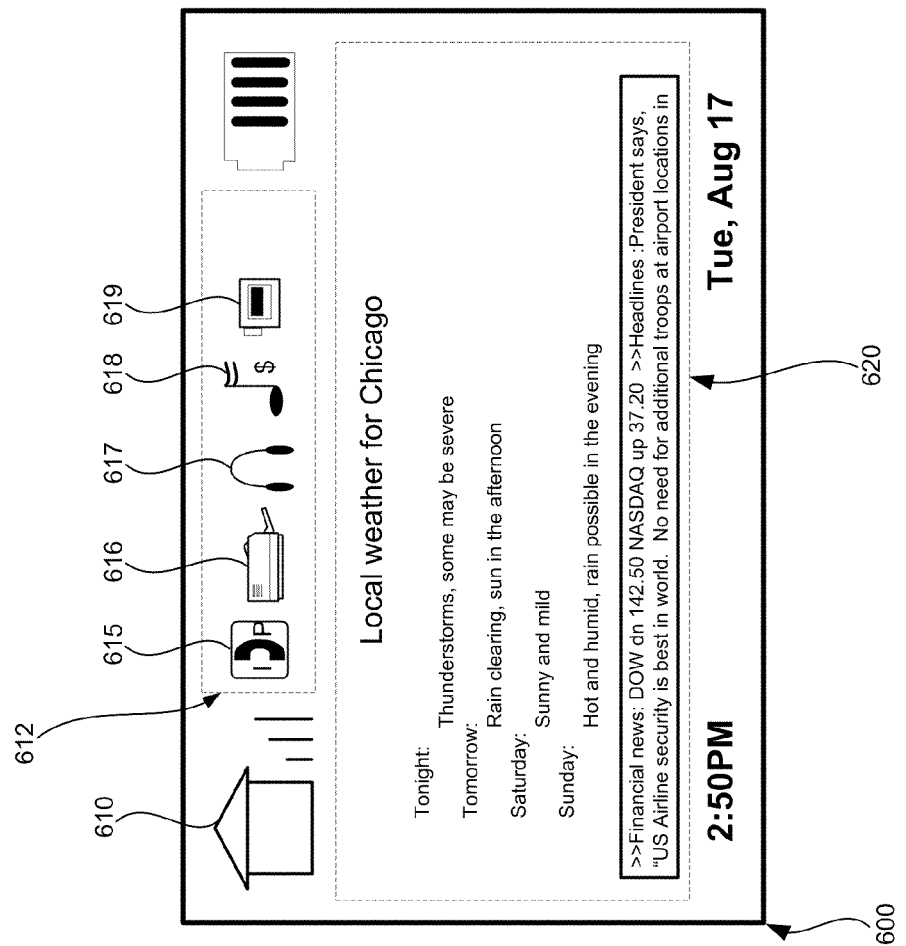
FIG. 6 shows an illustration of an exemplary display that may be visible on an access device that may correspond, for example, to the access device of FIG. 2, upon entering the coverage area of a wireless gateway, in accordance with a representative embodiment of the present invention.

FIG. 6 shows an illustration of an exemplary display 600 that may be visible on an access device that may correspond, for example, to the access device 124 of FIG. 2, upon entering the coverage area of a wireless gateway, in accordance with a representative embodiment of the present invention. The display 600 of FIG. 6 comprises a network indicator 610, a network services indicator area 612, a battery life indicator, a time of day indicator, and a day and date indicator. The display 600 also comprises a display area 620 to allow an access device to present graphical or textual information for a variety of reasons and from a number of sources. Upon arriving upon the coverage area of a wireless broadband access gateway as described with respect to FIGS. 3, 4A, 4B, 5A, and 5B, above, an access device in accordance with a representative embodiment of the present invention may exchange information that identifies the access device to the gateway. The wireless broadband access gateway may receive identification information from each of the access devices within the coverage area of the wireless broadband access gateway. The wireless broadband access gateway may also collect from each access device information describing the multimedia information and media-related services that each access device chooses to make available. The gateway may select a portion of the collected descriptive information based upon the received identification information. The display 600 of the arriving access device may then be updated via the wireless broadband access gateway to reflect the descriptive information for the multimedia information and media-related services that the gateway selected based upon the identification information that the arriving access device provided to the wireless broadband access gateway. For example, in the illustration of FIG. 6, the network indicator 610, and the text message 630 in the display area 620 have been updated to indicate that a personal area network has been detected. In addition, in the example of FIG. 6, the network services indicator area 612 has been updated to comprise an Internet protocol (IP) phone service icon 615, a printer service icon 616, a stereo entertainment icon 617, a pay music service icon 618, and a video entertainment icon 619, showing those services advertised by the wireless broadband access gateway as being available to an appropriately identified or authorized user of the access device. Further details concerning the advertising of media services by a wireless broadband access gateway may be found in U.S. patent application Ser. No. 11/021,294, entitled "Method And System For Extended Network Access Services Advertising Via A Broadband Access Gateway", filed Dec. 23, 2004, the complete subject matter of which is hereby incorporated herein by reference, in its entirety. The services indicated in the network services indicator area 612 may correspond to the services offered by access devices about which a wireless broadband access gateway such as, for example, gateway 118 or router 130 of FIG. 2, has become aware. For example, an access device entering the coverage area of the gateway described with respect to FIG. 3, above, may display icons in the network services indicator area 612 that may represent a portion of those multimedia information and services shown in the "Devices" 312 and "Services" 314 columns of FIG. 3. The user viewing the display 600 of FIG. 6 may select any of the displayed icons 615-619, to access multimedia information and services of access device(s) with which the wireless broadband access gateway is in communication.

Figure 7:
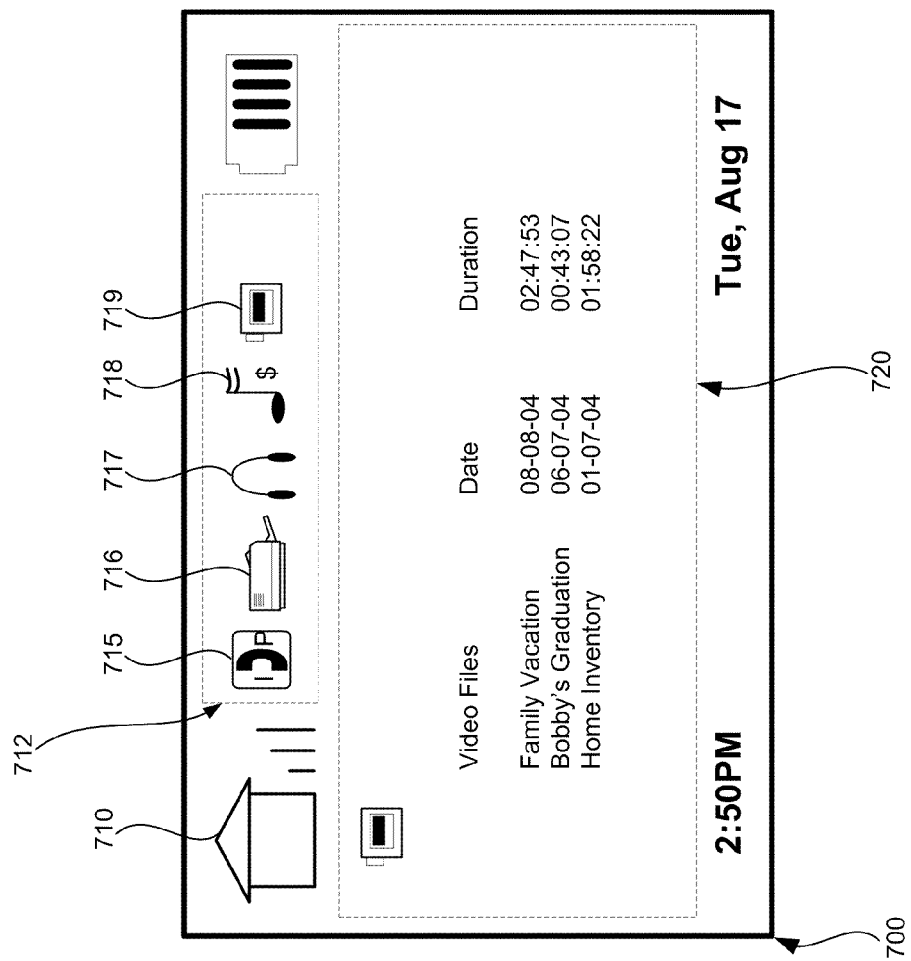
FIG. 7 shows an exemplary display subsequent to the selection of the video entertainment icon in the network services indicator area of the display of FIG. 6, for example, in accordance with a representative embodiment of the present invention.

FIG. 7 shows an exemplary display 700 subsequent to the selection of the video entertainment icon 619 in the network services indicator area 612 of the display 600 of FIG. 6, for example, in accordance with a representative embodiment of the present invention. The display 700 comprises a network indicator 710, a network services indicator area 712, a battery life indicator, a time of day indicator, and a day and date indicator. The display 700 also comprises a display area 720 to allow an access device to present graphical or textual information for a variety of reasons and from a number of sources. The network services indicator area 712 in the example of FIG. 7 shows an Internet protocol (IP) phone service icon 715, a printer service icon 716, a stereo entertainment icon 717, a pay music service icon 718, and a video entertainment icon 719, as also displayed in the network services indicator area 612 of FIG. 6. The display area 720 of FIG. 7, however, has been updated to show the video files available via the wireless broadband access gateway with which the access device is in communication. The names of the video files shown in the display area 720 of the example of FIG. 7 correspond to the MPEG format files of the entries for "Family Vacation" 422, "Bobby's Graduation" 424, and "Home Inventory" 426, because those video files are known to the wireless broadband access gateway with which the access device with display 700 is in communication. Although only the video media files for the "Digital Video Camera" of FIG. 4A are shown in FIG. 7, video media files from other access devices in communication with a wireless broadband access gateway may also be listed, when available. In addition, although the display area 720 shows a textual listing of the available video media files, other forms of presentation (e.g., graphical icons) may also be used.

Figure 8:
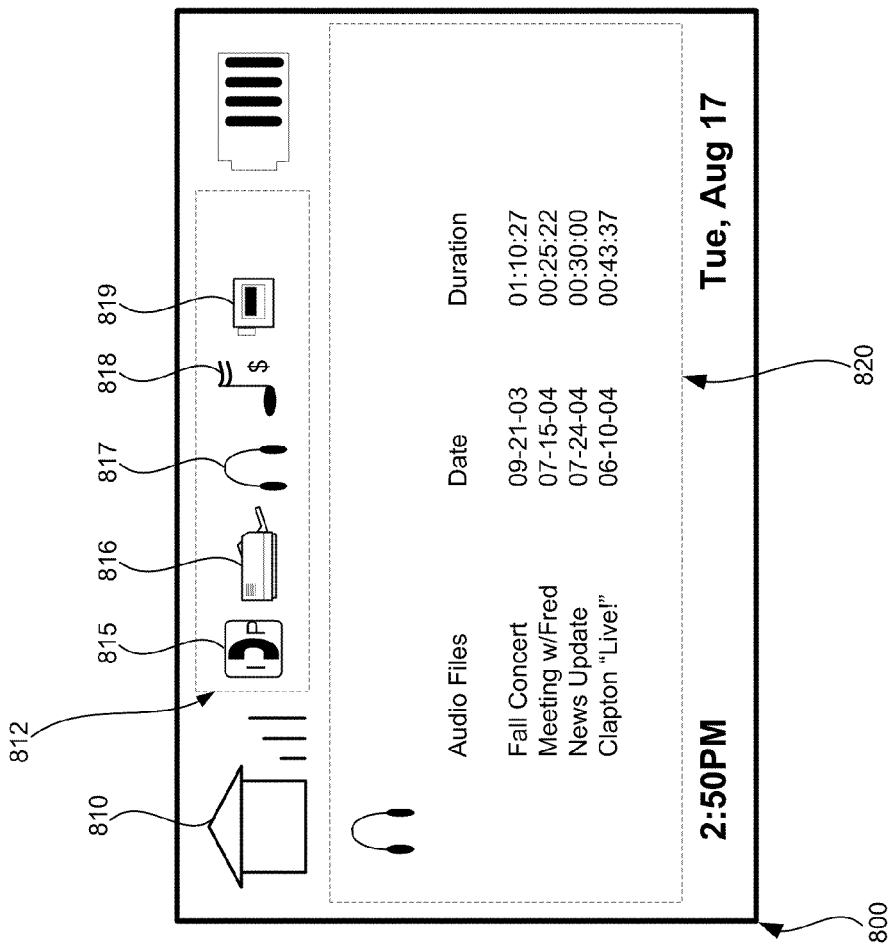
FIG. 8 shows an exemplary display subsequent to the selection of the stereo entertainment icon in the network services indicator area of the display of FIG. 6, for example, in accordance with a representative embodiment of the present invention.

FIG. 8 shows an exemplary display 800 subsequent to the selection of the stereo entertainment icon 617 in the network services indicator area 612 of the display 600 of FIG. 6, for example, in accordance with a representative embodiment of the present invention. Similar to the display 700 of FIG. 7, the display 800 comprises a network indicator 810, a network services indicator area 812, a battery life indicator, a time of day indicator, and a day and date indicator. The display 800 also comprises a display area 820 to allow an access device to present graphical or textual information for a variety of reasons and from a number of sources. The network services indicator area 812 in the example of FIG. 8 shows an Internet protocol (IP) phone service icon 815, a printer service icon 816, a stereo entertainment icon 817, a pay music service icon 818, and a video entertainment icon 819, as displayed in the network services indicator area 612 of FIG. 6. The display area 820 has been updated to show the audio media files available via the wireless broadband access gateway with which the access device is in communication. In the example of FIG. 8, the names of the audio media files shown in the display area 820 correspond to the MP3 format files of the entries for "Fall Concert" 430 shown in FIG. 4A, and the entries for "Meeting w/Fred" 526, "News Update" 528, and "Clapton 'Live!'" 530 of FIG. 5A, because those audio media files are known to the wireless broadband access gateway with which the access device with display 800 is in communication. The example of FIG. 8 illustrates the ability of a wireless broadband access gateway in accordance with a representative embodiment of the present invention to act as a focal point for access to the multimedia information and services of a variety of access devices, in this case, media files from both the "Digital Video Camera" of FIGS. 4A and 4B, and the "Mobile Multimedia Handset" of FIGS. 5A and 5B. It should again be noted that, although the display area 820 of FIG. 8 shows a textual listing of the available audio media files, other forms of presentation (e.g., graphical icons) may also be used.

Figure 9:
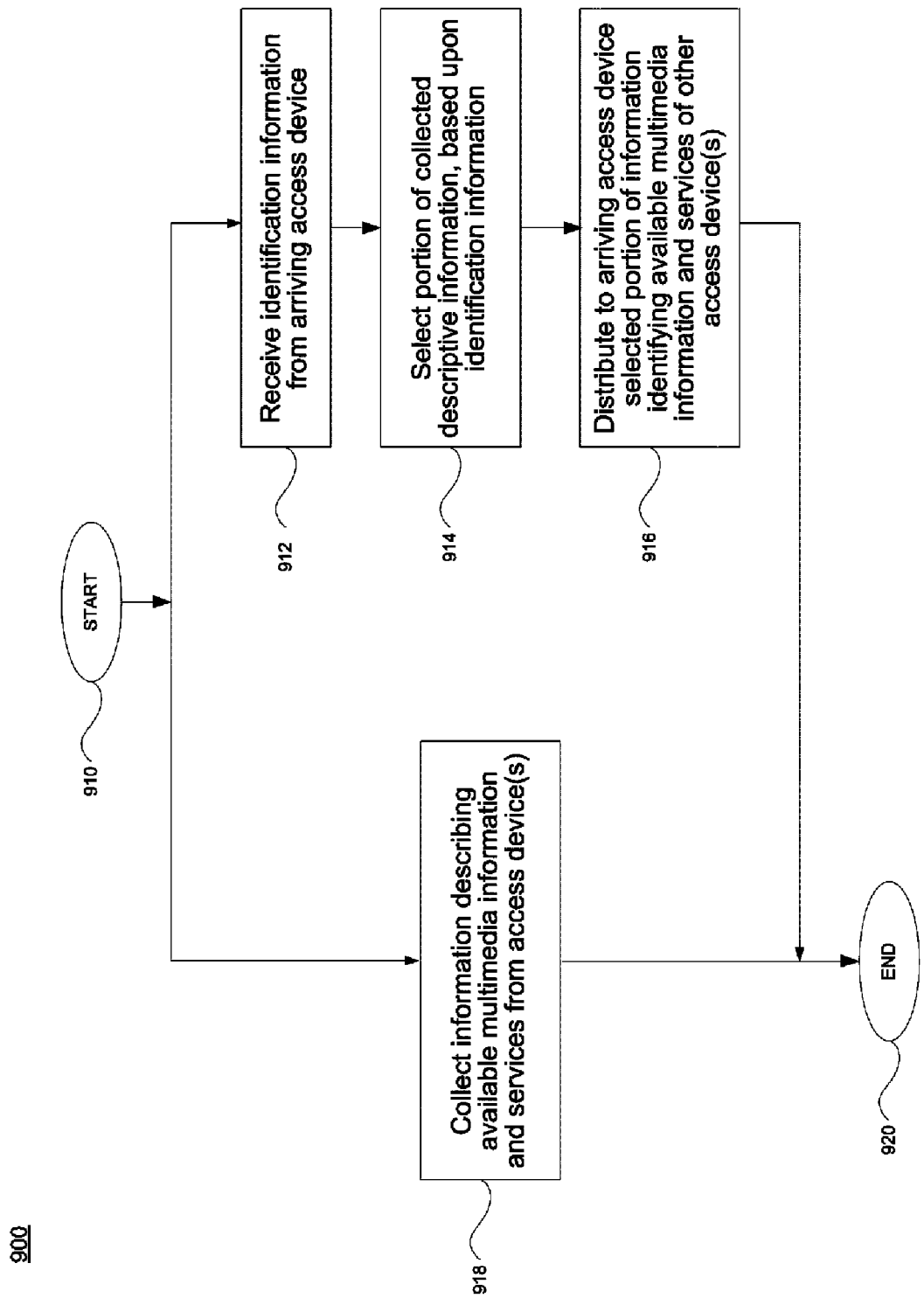
FIG. 9 shows a flowchart illustrating an exemplary method of supporting the registration of access device data in a wireless broadband access gateway such as, for example, the gateway and router of FIG. 2, in accordance with a representative embodiment of the present invention.

FIG. 9 shows a flowchart 900 illustrating an exemplary method of supporting the registration and sharing of access device data in a wireless broadband access gateway such as, for example, the gateway 118 and router 130 of FIG. 2, in accordance with a representative embodiment of the present invention. As an aid to understanding, the following discussion of FIG. 9 makes reference to the elements of FIG. 2, although the exemplary method of FIG. 9 is not limited to being performed by the elements of FIG. 2. It should be noted that the actions of gateway 118 may also be performed with respect to the router 130. The method illustrated by FIG. 9 begins at a start block 910 when a wireless broadband access gateway or router such as, for example, the gateway 118 or router 130 is powered up. The flowchart is shown as having two parallel paths in which activities may occur concurrently with respect to multiple access devices. In the left path of the example of FIG. 9, the method collects information describing multimedia information and media-related services that may be made available from each of the access devices within the coverage area of a wireless broadband access gateway such as, for example access device 124 of FIG. 2 (block 918). Such descriptive information may comprise, for example, one or more of a file name, a file or media type, a file size, a duration or playback time, a member number, an administrative ID, an electronic serial number, an Internet protocol (IP) address, a media access control (MAC) address, and information identifying the make and/or model of an access device. This may occur, for example, as each access device establishes communication with the gateway, or periodically while an access device is in the coverage area of the gateway. The exchange of such information may, for example, depend upon the successful authentication of the gateway and the access device to one another. This activity allows access device(s) to register or share information describing multimedia information and media-related services they may have available, and results in the gateway having a collection of information describing all of the multimedia information and media-related services that may be available from all of the access devices with which the gateway is in communication. The activity of the left pact of FIG. 9 is an ongoing process in which the appearance of new access devices or new sources of multimedia information and media related services grows the collection of information, while time or the inability to access multimedia information or media-related services previously registered may cause the collection of information to shrink.

The activities of the right path of FIG. 9 begin when a wireless broadband access gateway such as, for example, the gateway 118 of FIG. 2 receives identification information from an arriving access device (block 912). In a representative embodiment of the present invention, the arriving access device may be an access device such as, for example, the access device 124 of FIG. 2, that has just entered the coverage area of the wireless broadband access gateway, or an access device that may have re-submitted its identification information. At some time after the gateway 118 receives the identification information, the gateway 118 may select a portion of the descriptive information collected in the left path of FIG. 9, using the identification information from the arriving access device (block 914) The gateway 118 may then share or distribute with the arriving access device selected portions of the information describing the multimedia information and services that may be available from the access devices with which the gateway is currently in communication (block 916). The arriving access device may then use the information distributed by the gateway 118 to access the multimedia information and media-related services resident on other access devices, or on the broadband network. Note that the gateway 118 may provide information allowing the access devices with which it is in communication to access multimedia information or content on other access devices, or that is accessible via a broadband connection, and may not be the source or origin of such multimedia information. In such an arrangement, the gateway 118 or router 130 may act to provide virtual, but not necessarily actual, aggregation of the multimedia information and services available from the broadband network and the collection of access devices with which the gateway may be in communication. The method then ends (block 920).

Figure 10:
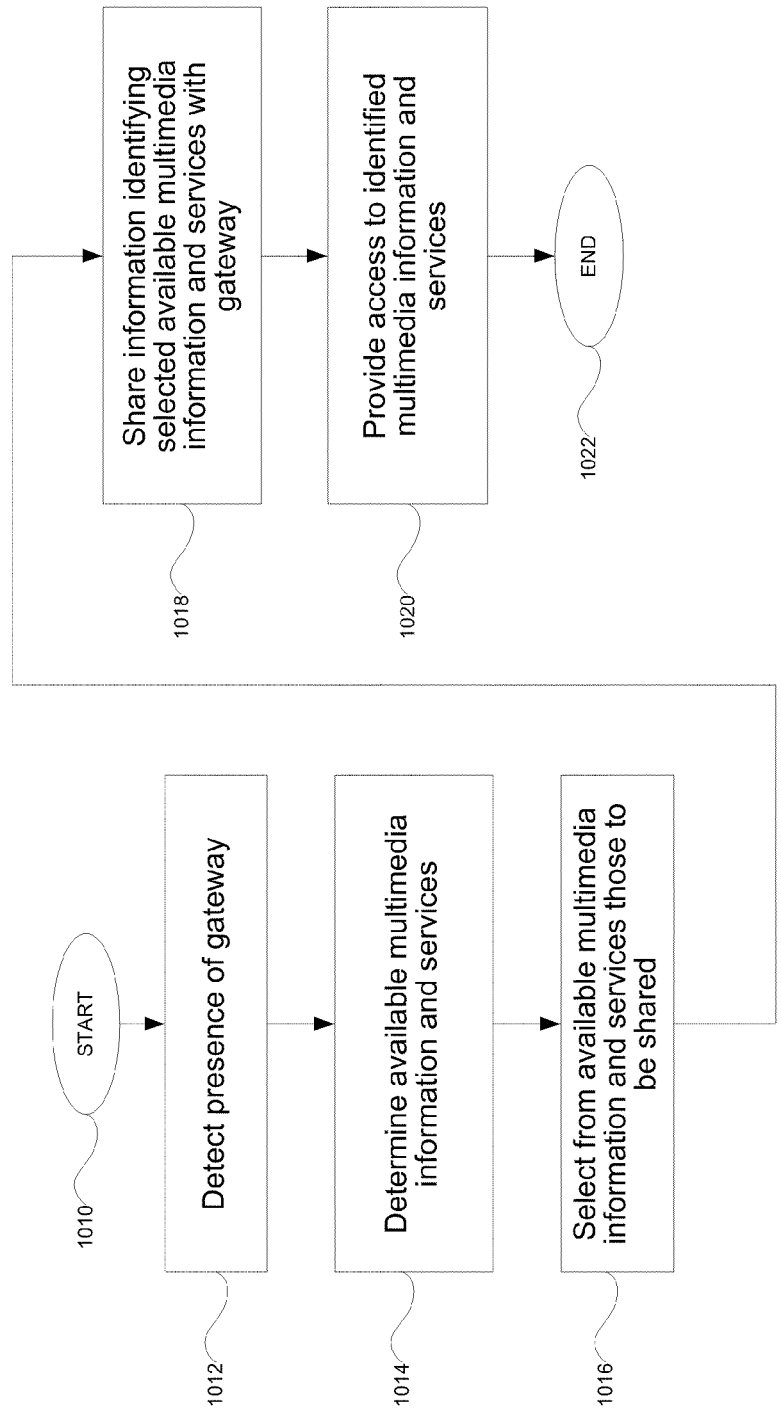
FIG. 10 shows a flowchart illustrating an exemplary method of supporting the registration of access device data by an access device with a wireless broadband access gateway such as, for example, the gateway and router of FIG. 2, in accordance with a representative embodiment of the present invention.

FIG. 10 shows a flowchart 1000 illustrating an exemplary method of supporting the registration of access device data by an access device, with a wireless broadband access gateway such as, for example, the gateway 118 and router 130 of FIG. 2, in accordance with a representative embodiment of the present invention. For purposes of clarity of understanding, the following method references the elements of FIG. 2, although such method is not limited to being performed by the elements of FIG. 2. It should be noted that representative embodiments of the present invention are not limited only to the elements shown in FIG. 2. As described in the examples provided above, the functionality of the gateway 118 and the router 130 of FIG. 2 may be considered to be equivalent. The method illustrated in FIG. 10 begins at a start block 1010, when an access device such as, for example, the access device 124 of FIG. 2 enters the coverage area of a wireless broadband gateway such as, for example, the gateway 118 or router 130. At some point, the access device 124 detects the presence of the gateway 118 (block 1012), and determines what available multimedia information and services it has to share with others via the gateway (block 1014). The access device 124 may then select from the collection of all multimedia information and services that it has available, the multimedia information and services that may be shared with others (block 1016). The selection process may be based, for example, upon one or more of a file name, a file or media type, a file size, a duration or playback time information, and a user configurable share parameter alone or in combination with information received by the access device from the gateway. Once the selection process is complete, the access device may share the information about the selected available multimedia information and services with the gateway (block 1018). The exchange of any information with the gateway 118 may be dependent upon the identification and/or authorization of one or both of the gateway 118 and the access device 124 to the other. The information shared with the gateway 118 may comprise, for example, one or more of a file name, a file or media type, a file size, a duration or playback time, a member number, an administrative ID, an electronic serial number, an Internet protocol (IP) address, a media access control (MAC) address, and information identifying the make and/or model of an access device. At some later time, the access device 124 may provide access to portions of the selected multimedia information and services to another access device via the gateway (block 1020). The access may be based upon a request from another access device within the personal area network served by the gateway, or from an entity outside of the coverage area of the personal area network, via the broadband connection 107. Again, access to the multimedia information and services of the access device 124 may be based upon identification and/or authorization of the recipient of the multimedia information and/or services, and may include the use of, for example, a digital certificate mechanism. The method of FIG. 10 then ends (block 1022).

Aspects of the present invention may be seen in a system supporting sharing of at least one of multimedia information and media-related services among a plurality of access devices. A representative embodiment of the present invention may comprise a gateway communicatively coupled to a broadband network and at least one wireless interface. The gateway may be capable of selectively exchanging multimedia information among the at least one wireless interface and the broadband network, and of communicating with the plurality of access devices via the at least one wireless interface. The gateway may also be capable of collecting, from at least one of the plurality of access devices, information descriptive of at least one of multimedia information and media-related services available on the at least one of the plurality of access devices. The gateway may be capable of selecting a portion of the collected information based upon identification information received from at least one other of the plurality of access devices, and of distributing to the at least one other of the plurality of access devices the selected portion of the collected information. Multimedia information may comprise at least one of streaming video, broadcast video, voice, digital data, text, digitized audio, digitized still images, digitized video, and digitized music, and media-related services may comprise at least one of accessing, recording, playing, exchanging, transmitting, receiving, converting, and translating of multimedia information.

In various representative embodiments of the present invention, the identification information may comprise at least one of an identifier of an access device, a user identifier, a member identifier, an electronic serial number, a media access control (MAC) address, an administrative identifier, a password, a commercial credit card number, a personal identification number, and a digital certificate. The at least one wireless interface may be compliant with the Bluetooth V1.2 or compatible personal area network (PAN) specification, may communicate using an unlicensed frequency band, and may communicate at a frequency of approximately 2.4 gigahertz. The at least one wireless interface may be compliant with at least one of the Institute of Electrical and Electronics Engineers (IEEE) 802.11a, 802.11b, 802.11g, and 802.11n standards. The broadband network in various representative embodiments of the present invention may comprise at least one of a digital subscriber line (DSL) network, a cable network, a satellite network, a cellular network, and the Internet. The cellular network may comprise at least one of a global system for mobile communications (GSM) network, a time division multiple access (TDMA) network, a code division multiple access (CDMA) network, and a universal mobile telecommunications system (UMTS) network. The information descriptive of multimedia information may comprise at least one of a file name, a file type, a media type, a file size, a duration, a playback time, a member number, an administrative ID, an electronic serial number, an Internet protocol (IP) address, a media access control (MAC) address, information identifying a make of an access device, and information identifying a model of an access device. In various representative embodiments in accordance with the present invention, the plurality of access devices may comprise at least one of a mobile multimedia handset, a personal digital assistant (PDA), a personal computer (PC), a digital scanner, a digital camera, a printer, headphones, and a pointing device.

Further aspects of the present invention may be found in a method supporting the sharing of at least one of multimedia information and media-related services using a plurality of access devices. Such a method may comprise collecting, via at least one of a wireless and a wired network, information describing at least one of multimedia information and media-related services available from the plurality of access devices. The method may also comprise receiving information identifying at least one of the plurality of access devices, and selecting a portion of the collected information based upon the received identification information. The method may comprise distributing the selected portion of collected information to the at least one of the plurality of access devices. The information describing multimedia information available from the plurality of access devices may comprise at least one of a file name, a file type, a media type, a file size, a duration, a playback time, a member number, an administrative ID. The information describing multimedia information available from the plurality of access devices may also comprise an electronic serial number, an Internet protocol (IP) address, a media access control (MAC) address, information identifying a make of an access device, and information identifying a model of an access device.

In various representative embodiments of the present invention, the information describing media-related services may comprise representations of at least one of accessing, recording, playing, exchanging, transmitting, receiving, converting, and translating of multimedia information. The wireless network may be compliant with the Bluetooth V1.2 or compatible personal area network (PAN) specification, may communicate using an unlicensed frequency band, and may communicate at a frequency of approximately 2.4 gigahertz. In addition, the wireless network may be compliant with at least one of the Institute of Electrical and Electronics Engineers (IEEE) 802.11a, 802.11b, 802.11g, and 802.11n standards. A method in accordance with a representative embodiment of the present invention may also comprise exchanging, via at least one of the wireless and a broadband network, the at least one of multimedia information and media-related services. The broadband network may comprise at least one of a digital subscriber line (DSL) network, a cable network, a satellite network, a cellular network, and the Internet. The cellular network may comprise at least one of a global system for mobile communications (GSM) network, a time division multiple access (TDMA) network, a code division multiple access (CDMA) network, and a universal mobile telecommunications system (UMTS) network. In various representative embodiments of the present invention, the multimedia information may comprise at least one of streaming video, broadcast video, voice, digital data, text, digitized audio, digitized still images, digitized video, and digitized music. In addition, the plurality of access devices may comprise at least one of a mobile multimedia handset, a personal digital assistant (PDA), a personal computer (PC), a digital scanner, a digital camera, a printer, headphones, and a pointing device.

Yet other aspects of the present invention may be observed in a machine-readable storage, having stored thereon a computer program having a plurality of code sections executable by a machine, for causing the machine to perform the operations of the method described above.

In a representative embodiment of the present invention, the wireless local area networks may include data networks such as, for example, Institute of Electrical and Electronics Engineer (IEEE) 802.11a/b/g/n compliant wireless networks such as those located in homes, hot spots or an office. Such local area networks may operate in unlicensed radio frequency spectrum such as in, for example, the 2.4 and 5 gigahertz regions. Examples of wide area networks may include cellular digital packet data (CDPD), voice and data networks such as public switched telephone networks (PSTN), Global System For Mobile Communication (GSM), GSM General Packet Radio Service (GPRS), GSM Short Message Service (SMS), GSM Enhanced Data Rates For Global Evolution (EDGE), North American Time Division Multiplex Access (TDMA), iDEN, Code Division Multiple Access (CDMA) and CDMA2000 1xRT, Universal Mobile Telecommunications System (UMTS) network, to name only a few.

A personal area network (PAN) may be formed by a plurality of wireless communication access devices such as, for example, mobile multimedia handsets, PDAs, telephones, and computers. Other elements of such a network may, for example, include computer peripherals such as digital scanners, digital cameras, printers, headphones, and pointing devices, that may be located within the immediate proximity of a person. A PAN may be an ad-hoc network of such communication devices. In a representative embodiment of the present invention, access devices within the PAN may communicate with other access devices within the PAN and also with other access devices that are located in other networks accessible via the PAN. The personal area networks may include data networks such as, for example, a Bluetooth compliant network, and Institute of Electrical and Electronics Engineer (IEEE) 802.15.3a compliant wireless networks. Such personal area networks may operate in unlicensed radio frequency spectrum such as, for example, the 2.4 and 5 gigahertz regions. Details of one example of a personal area network are provided in the document "Bluetooth Core Specification V1.2", Nov. 5, 2003, from Bluetooth SIG, Inc., the complete subject matter of which is hereby incorporated herein by reference, in its entirety. For example, in a Bluetooth® wireless PAN, a first Bluetooth®-enabled wireless access device may communicate with a second Bluetooth®-enabled wireless access device within the PAN. Additionally, either of the first and second Bluetooth®-enabled wireless access devices may communicate with the Internet or another LAN or WAN via the Bluetooth® wireless PAN.

In a representative embodiment of the present invention, a gateway may be adapted to provide seamless and transparent communication between a plurality of access devices and a plurality of networks. The functionality of the gateway may be divided, for example, into application content functionality, and configuration and management functionality. The application content functionality may, for example, deal with the types of applications that may be supported by the gateway as well as the various types of data that may be received, processed and/or transmitted by the gateway. In this regard, application content functionality may also include the manner in which other devices and/or systems may utilize data from the gateway.

Content and application services are important because all the information coming into and leaving the home from either the WAN side (i.e., the broadband connection side), or from the PAN side (i.e., the access device side) converges at the gateway. The PAN side may comprise Bluetooth, wireless LAN (IEEE 802.11a/b/g/n), IEEE 802.15.3a ultra-wideband, or cellular, for example. Notwithstanding, the gateway may be adapted to convert, for example, wirelessly received GSM-formatted information into, for example, Internet protocol (IP)-formatted information and in reverse, converts IP-formatted information into wireless GSM-formatted information suitable for over-the-air transmission. Support for other wireless communication protocols such as TDMA, CDMA, and UMTS may also be provided. In a representative embodiment of the present invention, the gateway may comprise suitable circuitry, logic and/or code that may be adapted to receive and process MPEG related data, which may be suitable for display on a screen. The gateway in an embodiment of the present invention functions as a focal point where data converges from a plurality of wired and wireless services. Although, in a particular embodiment of the present invention the gateway may do very little in terms of actual content aggregation, there is virtual aggregation of data. The converged data may be integrated and or otherwise utilized to offer unique opportunities for launching various content and application services from a single strategic location. Since the gateway in an embodiment of the present invention is the focal point where data converges, one or more protocol stacks may be employed for launching the various content and application services.

The gateway in a representative embodiment of the present invention may be adapted to route calls based on established rules that may be programmed into the gateway. For example, the gateway may be governed by a rule which states that local calls are to be routed to an incumbent local exchange carrier (iLEC), while long distance calls are to be handled by Long Distance Carrier Company. Accordingly, when a call originates at the gateway and it is determined that the call is a local call, the gateway may be adapted to route the call to the iLEC. However, if the gateway determines that the call is a long distance call, then the gateway may be adapted to route the call to Long Distance Carrier Company.

A representative embodiment of the present invention may leverage existing broadband infrastructure that is commonly found in many homes and businesses today. Because a consumer is already paying for the use of the broadband infrastructure in their home or office, leveraging the use of the existing broadband infrastructure for communication with wide area networks results in minimal or no communication costs. The broadband infrastructure may be, for example, a cable or DSL infrastructure.

The wireless interface function provided by the gateway located within a home, for example, may be utilized to route or communicate a great deal of traffic to a wired network such as a broadband network or a wireless network such as a GSM or CDMA network via a broadband connection. In other words, the wireless gateway infrastructure provided by a representative embodiment of the present invention provides a scalable network infrastructure that rides on an existing access infrastructure already supplied by a broadband service provider to a home, office or business. Additionally, the scalable infrastructure provided by the gateway also solves the problems associated with signal penetration and propagation, thereby providing improved quality of service (QoS). From a market perspective, a wireless service provider may now have access to the necessary infrastructure to provide improved wireless services to users within a home or office. Accordingly, in order to rapidly increase their growth, wireless service providers may now target that portion of the in-home landline or plain old telephone system (POTS) business, which have traditionally been handled by incumbent local exchange carriers (ILECs) or other LECs.

The unlicensed mobile access gateway described above may possess a significant amount of processing power. The gateways of existing systems fall short of realizing the full potential of the merged wired and wireless communication network that is enabled by a representative embodiment of the present invention. Numerous basic and enhanced communication services may be enabled or provided by the gateway. Support for access devices such as, for example, mobile multimedia handsets and PDAs may be involved in order to utilize these basic and enhanced communication services enabled by the new wave of digital technologies. Current and/or proposed mobile access gateway systems, however, do not provide the range of support needed for their use by the everyday consumer.

The present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. One or more circuits for use in a system that supports sharing of one or both of multimedia information and media-related services among a plurality of access devices, the one or more circuits comprising:

at least one processor operably coupled to interface circuitry for communicating over a broadband network and to at least one wireless interface for communicating over a wireless network, to enable selective communication of multimedia information between and/or among the at least one wireless interface and the broadband network, and wireless communication with the plurality of access devices using the at least one wireless interface, the at least one processor configured to, at least:

receive identification information from each of the plurality of access devices;

collect, from a first of the plurality of access devices, information descriptive of one or both of multimedia information and media-related services available on the first of the plurality of access devices;

select at least a portion of the information descriptive of one or both of the multimedia information and the media-related services available on the first of the plurality of access devices and collected from the first of the plurality of access devices based upon the identification information received from a second of the plurality of access devices; and distribute to the second of the plurality of access devices the selected portion of the collected information.

2. The one or more circuits according to claim 1, wherein multimedia information comprises one or more of streaming video, broadcast video, voice, digital data, text, digitized audio, digitized still images, digitized video, and/or digitized music.

3. The one or more circuits according to claim 1, wherein media-related services comprise one or more of accessing, recording, playing, exchanging, transmitting, receiving, converting, and/or translating of multimedia information.

4. The one or more circuits according to claim 1, wherein the identification information comprises one or more of an identifier of an access device, a user identifier, a member identifier, an electronic serial number, a media access control (MAC) address, an administrative identifier, a password, a commercial credit card number, a personal identification number, and/or a digital certificate.

5. The one or more circuits according to claim 1, wherein the at least one wireless interface is compliant with the BLUETOOTH V1.2 or compatible personal area network (PAN) specification.

6. The one or more circuits according to claim 1, wherein the at least one wireless interface communicates using an unlicensed frequency band.

7. The one or more circuits according to claim 1, wherein the at least one wireless interface communicates at a frequency of approximately 2.4 gigahertz.

8. The one or more circuits according to claim 1, wherein the at least one wireless interface is compliant with one or more of the Institute of Electrical and Electronics Engineers (IEEE) 802.11a, 802.11b, 802.11g, and/or 802.11n standards.

9. The one or more circuits according to claim 1, wherein the broadband network comprises one or more of a digital subscriber line (DSL) network, a cable network, a satellite network, a cellular network, and the Internet.

10. The one or more circuits according to claim 9, wherein the cellular network comprises one or more of a global system for mobile communications (GSM) network, a time division multiple access (TDMA) network, a code division multiple access (CDMA) network, and/or a universal mobile telecommunications system (UMTS) network.

11. The one or more circuits according to claim 1, wherein the information descriptive of multimedia information comprises at least one of a file name, a file type, a media type, a file size, a duration, a playback time, a member number, an administrative ID, an electronic serial number, an Internet protocol (IP) address, a media access control (MAC) address, information identifying a make of an access device, and/or information identifying a model of an access device.

12. The one or more circuits according to claim 1, wherein the plurality of access devices comprises one or more of a mobile multimedia handset, a personal digital assistant (PDA), a personal computer (PC), a digital scanner, a digital camera, a printer, headphones, and/or a pointing device.

13. One or more circuits for use in a gateway device that supports sharing of one or both of multimedia information and media-related services among a plurality of access devices, the one or more circuits comprising:

at least one processor operably coupled to interface circuitry for communicating over a broadband network and to at least one wireless interface for communicating over a wireless network, to enable selective communication of multimedia information between and/or among the plurality of access devices, using the at least one wireless interface and the broadband network, the at least one processor configured to, at least:

receive identifying information from a first of the plurality of access devices;

collect, from the first of the plurality of access devices, information descriptive of one or both of multimedia information and media-related services available on the first access device;

select at least a portion of the collected information, based upon identification information received from a second of the plurality of access devices; and distribute to the second of the plurality of access devices the selected portion of the collected information, based upon the identification information received from the second access device.

14. The one or more circuits according to claim 13, wherein multimedia information comprises one or more of streaming video, broadcast video, voice, digital data, text, digitized audio, digitized still images, digitized video, and/or digitized music.

15. The one or more circuits according to claim 13, wherein media-related services comprise one or more of accessing, recording, playing, exchanging, transmitting, receiving, converting, and/or translating of multimedia information.

16. The one or more circuits according to claim 13, wherein the identification information comprises one or more of an identifier of an access device, a user identifier, a member identifier, an electronic serial number, a media access control (MAC) address, an administrative identifier, a password, a commercial credit card number, a personal identification number, and/or a digital certificate.

17. The one or more circuits according to claim 13, wherein the at least one wireless interface is compliant with the BLUETOOTH V1.2 or compatible personal area network (PAN) specification.

18. The one or more circuits according to claim 13, wherein the at least one wireless interface communicates using an unlicensed frequency band.

19. The one or more circuits according to claim 13, wherein the at least one wireless interface communicates at a frequency of approximately 2.4 gigahertz.

20. The one or more circuits according to claim 13, wherein the at least one wireless interface is compliant with one or more of the Institute of Electrical and Electronics Engineers (IEEE) 802.11a, 802.11b, 802.11g, and/or 802.11n standards.

21. The one or more circuits according to claim 13, wherein the broadband network comprises one or more of a digital subscriber line (DSL) network, a cable network, a satellite network, a cellular network, and/or the Internet.

22. The one or more circuits according to claim 21, wherein the cellular network comprises one or more of a global system for mobile communications (GSM) network, a time division multiple access (TDMA) network, a code division multiple access (CDMA) network, and/or a universal mobile telecommunications system (UMTS) network.

23. The one or more circuits according to claim 13, wherein the information descriptive of multimedia information comprises at least one of a file name, a file type, a media type, a file size, a duration, a playback time, a member number, an administrative ID, an electronic serial number, an Internet protocol (IP) address, a media access control (MAC) address, information identifying a make of an access device, and/or information identifying a model of an access device.

24. The one or more circuits according to claim 13, wherein the plurality of access devices comprises one or more of a mobile multimedia handset, a personal digital assistant (PDA), a personal computer (PC), a digital scanner, a digital camera, a printer, headphones, and/or a pointing device.

25. The one or more circuits according to claim 13, wherein the at least one processor is configured to, at least:
authenticate the gateway device to the first access device; and
wherein the information descriptive of one or both of multimedia information and media-related services available on the first access device is shared with the gateway device by the first access device only after successful authentication of the gateway device to the first access device.

26. The one or more circuits according to claim 13, wherein the at least one processor is configured to, at least:
maintain a database which associates the identifying information from the first of the plurality of access devices with the information descriptive of one or both of multimedia information and/or media-related services available on the first access device.

27. One or more circuits for use in an access device that supports sharing of one or both of multimedia information and media-related services among a plurality of access devices, the one or more circuits comprising:
at least one processor arranged to communicate with a gateway device using one or both of a broadband network and/or a wireless network, the at least one processor configured to, at least:
transmit identification information for the access device to the gateway device, upon determining that communication with the gateway device is possible using at least one of the broadband network and the wireless network;
selectively share information descriptive of one or both of multimedia information and media-related services available on the access device with the gateway device; and
receive, from a database in the gateway device, information collected from one or more of the plurality of access devices that is descriptive of one or both of multimedia information and media-related services available for sharing by the one or more of the plurality of access devices and that identifies each corresponding sharing access device.

28. The one or more circuits according to claim 27, wherein the at least one processor is configured to, at least:
perform an authentication of the gateway device before sharing; and
selecting what to share, based upon the authentication.

29. The one or more circuits according to claim 27, wherein the at least one processor is configured to, at least:
access one or both of multimedia information and media related services from the one or more of the plurality of access devices, based upon the received information descriptive of one or both of multimedia information and/or media-related services available for sharing by the plurality of access devices.

30. The one or more circuits according to claim 27, wherein multimedia information comprises one or more of streaming video, broadcast video, voice, digital data, text, digitized audio, digitized still images, digitized video, and/or digitized music.

31. The one or more circuits according to claim 27, wherein media-related services comprise one or more of accessing, recording, playing, exchanging, transmitting, receiving, converting, and/or translating of multimedia information.

32. The one or more circuits according to claim 27, wherein the identification information comprises one or more of an identifier of an access device, a user identifier, a member identifier, an electronic serial number, a media access control (MAC) address, an administrative identifier, a password, a commercial credit card number, a personal identification number, and/or a digital certificate.

33. The one or more circuits according to claim 27, wherein the wireless network operates according to the BLUETOOTH V1.2 or compatible personal area network (PAN) specification.

34. The one or more circuits according to claim 27, wherein the wireless network operates using an unlicensed frequency band.

35. The one or more circuits according to claim 27, wherein the wireless network operates at a frequency of approximately 2.4 gigahertz.

36. The one or more circuits according to claim 27, wherein the wireless network operates according to one or more of the Institute of Electrical and Electronics Engineers (IEEE) 802.11a, 802.11b, 802.11g, and/or 802.11n standards.

37. The one or more circuits according to claim 27, wherein the broadband network comprises one or more of a digital subscriber line (DSL) network, a cable network, a satellite network, a cellular network, and the Internet.

38. The one or more circuits according to claim 37, wherein the cellular network comprises one or more of a global system for mobile communications (GSM) network, a time division multiple access (TDMA) network, a code division multiple access (CDMA) network, and/or a universal mobile telecommunications system (UMTS) network.

39. The one or more circuits according to claim 27, wherein the information descriptive of multimedia information comprises at least one of a file name, a file type, a media type, a file size, a duration, a playback time, a member number, an administrative ID, an electronic serial number, an Internet protocol (IP) address, a media access control (MAC) address, information identifying a make of an access device, and/or information identifying a model of an access device.

40. The one or more circuits according to claim 27, wherein the plurality of access devices comprises one or more of a mobile multimedia handset, a personal digital assistant (PDA), a personal computer (PC), a digital scanner, a digital camera, a printer, headphones, and/or a pointing device.

* * * * *